US012734942B2

(12) United States Patent
Pesach

(10) Patent No.: US 12,734,942 B2
(45) Date of Patent: Sep. 15, 2026

(54) CAR SAFETY SEAT

(71) Applicant: Tetro Ltd., Quarry Bay (HK)

(72) Inventor: Gidon Pesach, Kfar Vitkin (IL)

(73) Assignee: Tetro Ltd., Quarry Bay (HK)

( * ) Notice: Subject to any disclaimer, the term of this patent is extended or adjusted under 35 U.S.C. 154(b) by 243 days.

(21) Appl. No.: 18/550,170

(22) PCT Filed: Oct. 24, 2021

(86) PCT No.: PCT/IL2021/051256
§ 371 (c)(1),
(2) Date: Sep. 12, 2023

(87) PCT Pub. No.: WO2022/195573
PCT Pub. Date: Sep. 22, 2022

(65) Prior Publication Data

US 2024/0157858 A1 May 16, 2024

Related U.S. Application Data

(60) Provisional application No. 63/160,844, filed on Mar. 14, 2021.

(51) Int. Cl.
*B60N 2/28* (2006.01)

(52) U.S. Cl.
CPC .................................. *B60N 2/2869* (2013.01)

(58) Field of Classification Search
CPC .................................................... B60N 2/2869
See application file for complete search history.

(56) References Cited

U.S. PATENT DOCUMENTS 813,688 A 2/1906 Bartelt
5,183,312 A 2/1993 Nania
(Continued)

FOREIGN PATENT DOCUMENTS

CN 101311041 A 11/2008
CN 107813737 A 3/2018
(Continued)

OTHER PUBLICATIONS

Fujimori, JP 200094992 A, Apr. 4, 2000, Specification, machine translation (Year: 2000).*

*Primary Examiner* — David R Dunn
*Assistant Examiner* — Tania Abraham
(74) *Attorney, Agent, or Firm* — Ballard Spahr LLP

(57) ABSTRACT

A rotatable safety seat assembly comprises an upper portion with a seat and a seat rotational element having a fixed connection to the seat such that it is rotatable together with seat about a seat rotational axis, a lower portion configured for being mounted to a passenger's seat of a car and having a central axis spaced from the seat rotational axis. The seat assembly further comprises a movement mechanism connected to the seat rotational element and operable to translate rotation of the seat rotational element about the seat rotational axis into movement of the seat rotational element along a circular trajectory around the central axis and vice versa. The assembly can further comprise a locking mechanism operable to selectively enable a first unlocked state in which the movement mechanism is operable to enable the rotational movement of the seat with the seat rotational element about the central rotational axis of the lower portion while the locking mechanism prevents the rotational movement of the seat with the seat rotational element about the seat rotational axis, and a second unlocked state in which the seat with the seat rotational element is free to rotate about the seat rotational axis and the movement mechanism is (Continued)

operable to translate the rotational movement of the seat with the seat rotational element about the seat rotational axis into the rotational movement of the seat with the seat rotational element about the central rotational axis and vice versa.

20 Claims, 24 Drawing Sheets

(56) References Cited

U.S. PATENT DOCUMENTS

| | | | | |
|---|---|---|---|---|
| 5,380,062 | A | 1/1995 | Nania | |
| 5,651,576 | A | 7/1997 | Wallace | |
| 6,241,314 | B1 | 6/2001 | Pufall | |
| 6,347,832 | B2 | 2/2002 | Mori | |
| 6,520,579 | B2 | 2/2003 | Kassai et al. | |
| 6,557,919 | B2 | 5/2003 | Suga et al. | |
| 6,572,172 | B1 | 6/2003 | Ninomiya et al. | |
| 6,572,189 | B1 | 6/2003 | Blaymore | |
| 6,793,283 | B1 | 9/2004 | Sipos | |
| 6,962,383 | B2 | 11/2005 | Takenoshita et al. | |
| 7,029,069 | B2 | 4/2006 | Hendren et al. | |
| 7,364,234 | B2 | 4/2008 | Begin et al. | |
| 7,753,444 | B2 | 7/2010 | Vallentin | |
| 7,891,721 | B2 | 2/2011 | Pesach | |
| 8,033,605 | B2 | 10/2011 | Miura et al. | |
| 8,136,881 | B2 | 3/2012 | Vertegaal | |
| 9,010,861 | B2 | 4/2015 | Seibold et al. | |
| 9,969,305 | B1 | 5/2018 | Sheriff | |
| 10,710,478 | B2 | 7/2020 | Reaves et al. | |
| 11,254,240 | B2 | 2/2022 | Baccouche et al. | |
| 11,370,334 | B2 | 6/2022 | Mo | |
| 2002/0163232 | A1 | 11/2002 | Vezinet et al. | |
| 2005/0077765 | A1 | 4/2005 | Biaud | |
| 2005/0179302 | A1 | 8/2005 | Chung et al. | |
| 2005/0236877 | A1* | 10/2005 | Hendren | B60N 2/2869 297/250.1 |
| 2008/0054695 | A1* | 3/2008 | Lhomme | B60N 2/2806 297/256.12 |
| 2008/0252122 | A1* | 10/2008 | Vallentin | B60N 2/2869 297/256.12 |
| 2009/0091167 | A1 | 4/2009 | Jha et al. | |
| 2011/0298257 | A1* | 12/2011 | Abadilla | B60N 2/2863 29/428 |
| 2022/0410768 | A1 | 12/2022 | Mo | |
| 2024/0375561 | A1 | 11/2024 | Nakhla et al. | |

FOREIGN PATENT DOCUMENTS

| | | | |
|---|---|---|---|
| CN | 208852823 | U | 5/2019 |
| CN | 111873865 | A | 11/2020 |
| CN | 112477712 | A | 3/2021 |
| DE | 20023635 | U1 | 4/2005 |
| DE | 202010017818 | U1 | 11/2012 |
| EP | 0947383 | A1 | 10/1999 |
| FR | 2733132 | A1 | 10/1996 |
| FR | 2778376 | A1 | 11/1999 |
| FR | 2811274 | A1 | 1/2002 |
| FR | 2854597 | A1 | 11/2004 |
| GB | 2050971 | A | 1/1981 |
| GB | 2236476 | A | 4/1991 |
| JP | S47036247 | Y | 11/1972 |
| JP | S61139831 | U | 8/1986 |
| JP | H11255045 | A | 9/1999 |
| JP | 2000094992 | A | 4/2000 |
| JP | 2002225599 | A | 8/2002 |
| JP | 2004066981 | A | 3/2004 |
| JP | 2004357778 | A | 12/2004 |
| JP | 7420455 | B2 | 1/2024 |
| KR | 20050106655 | A | 11/2005 |
| KR | 20210020679 | A | 2/2021 |
| KR | 20230032163 | A | 3/2023 |
| WO | 2009116847 | A1 | 9/2009 |
| WO | 2015025429 | A1 | 2/2015 |
| WO | 2018053879 | A1 | 3/2018 |
| WO | 2018054249 | A1 | 3/2018 |
| WO | 2019134503 | A1 | 7/2019 |
| WO | 2021122901 | A1 | 6/2021 |
| WO | 2022195573 | A1 | 9/2022 |
| WO | 2023046954 | A1 | 3/2023 |
| WO | 2023166181 | A1 | 9/2023 |
| WO | 2024072888 | A2 | 4/2024 |
| WO | 2024136921 | A1 | 6/2024 |
| WO | 2024191743 | A2 | 9/2024 |

* cited by examiner

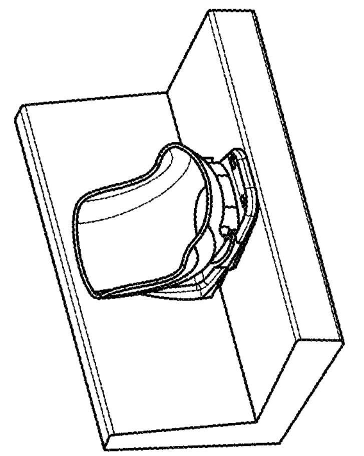
FIG. 1G1
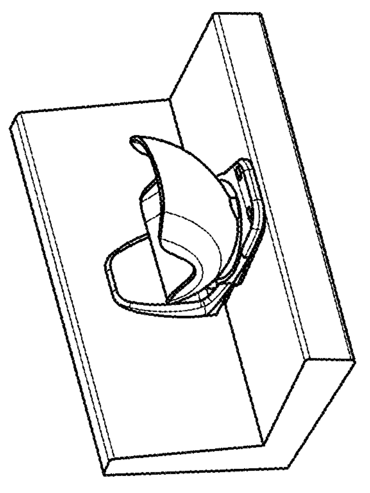
FIG. 1G2
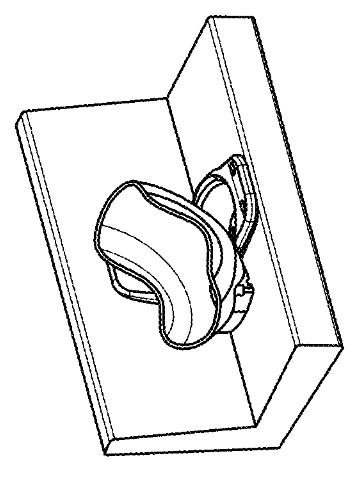
FIG. 1G3
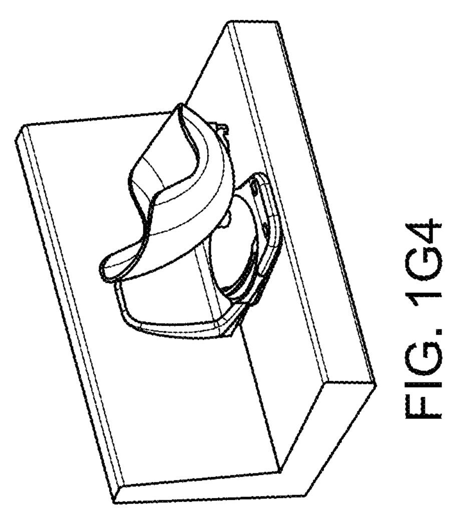
FIG. 1G4

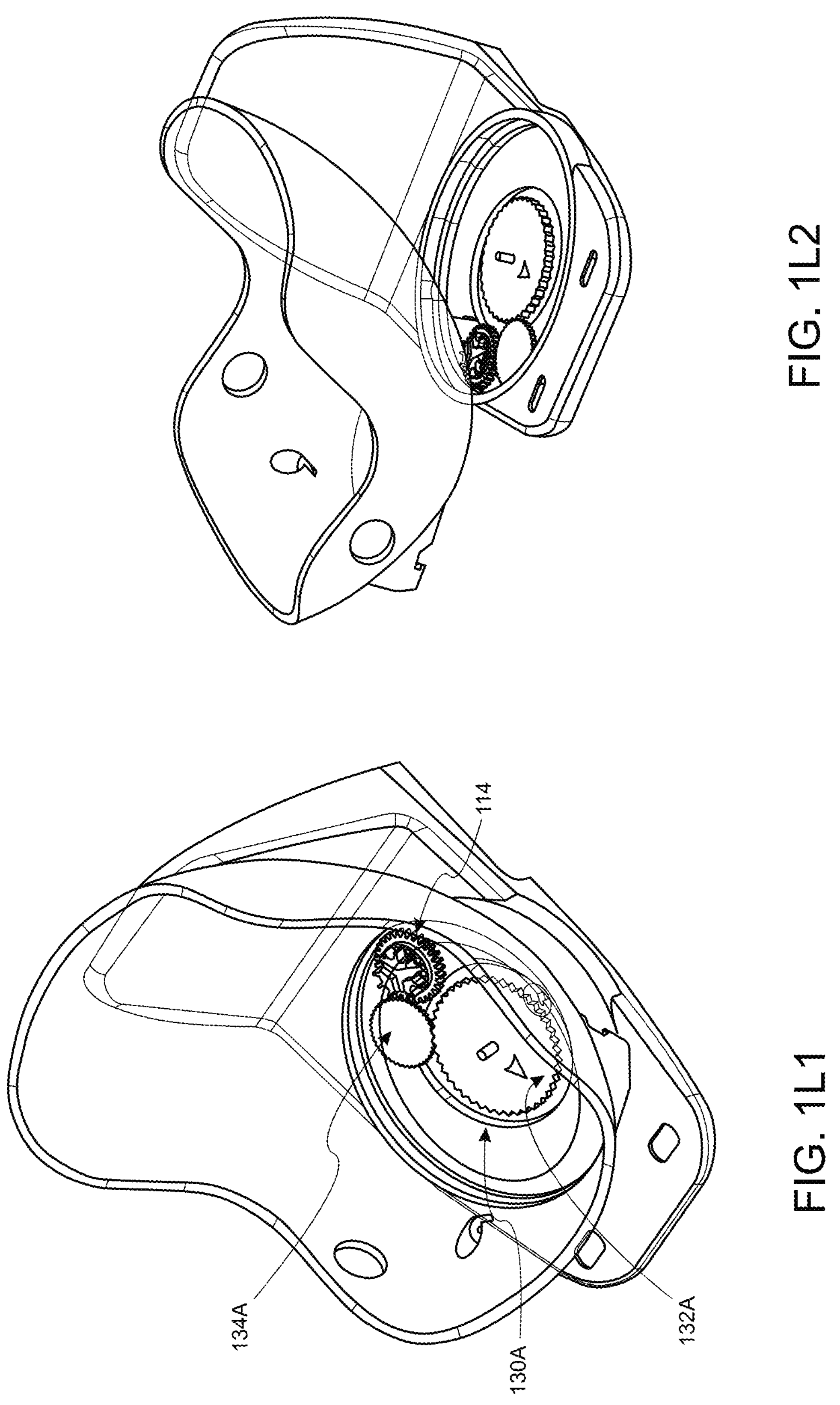
FIG. 1L2
FIG. 1L1

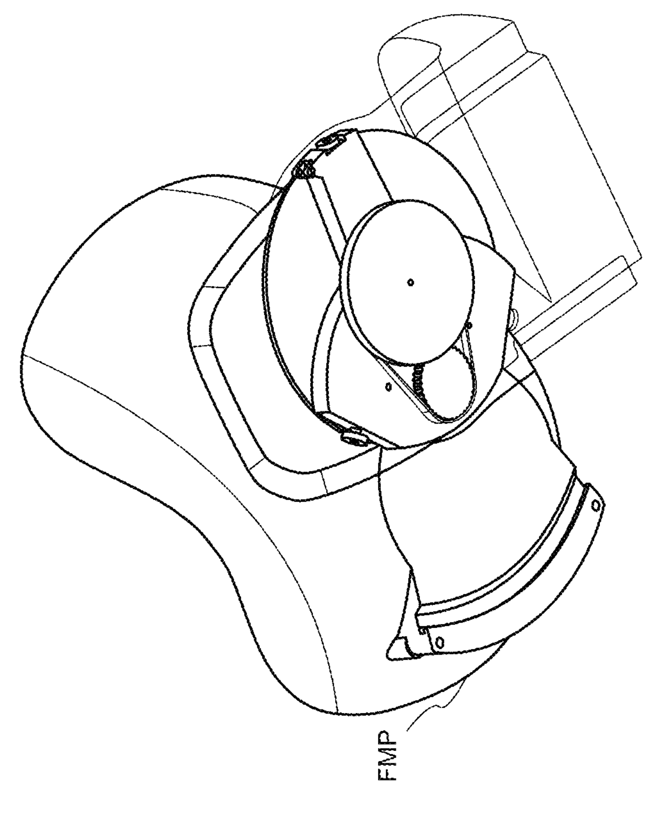
FIG. 2A2
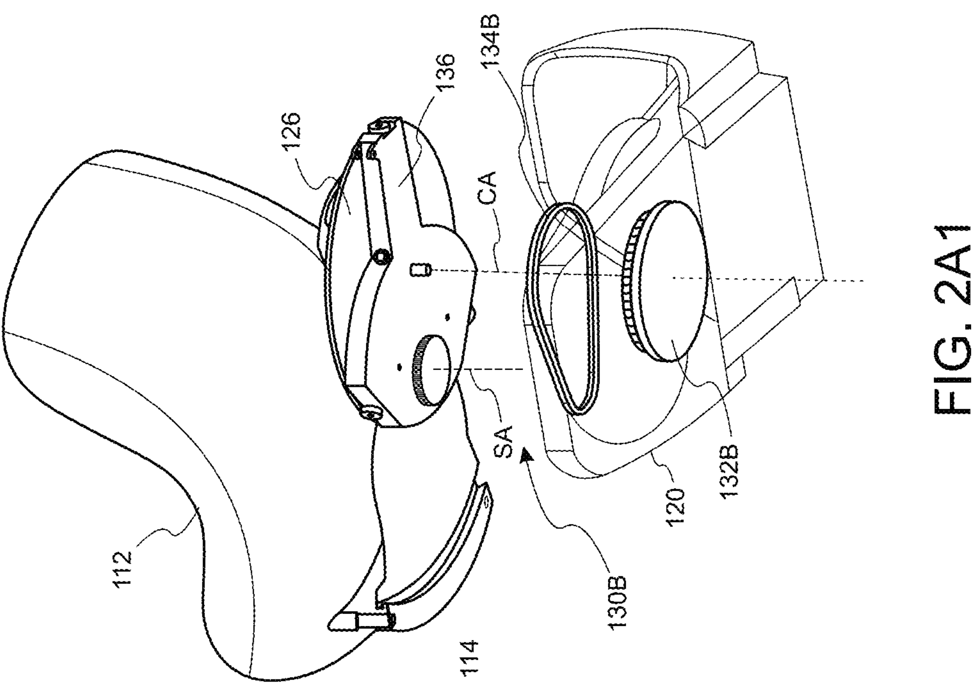
FIG. 2A1

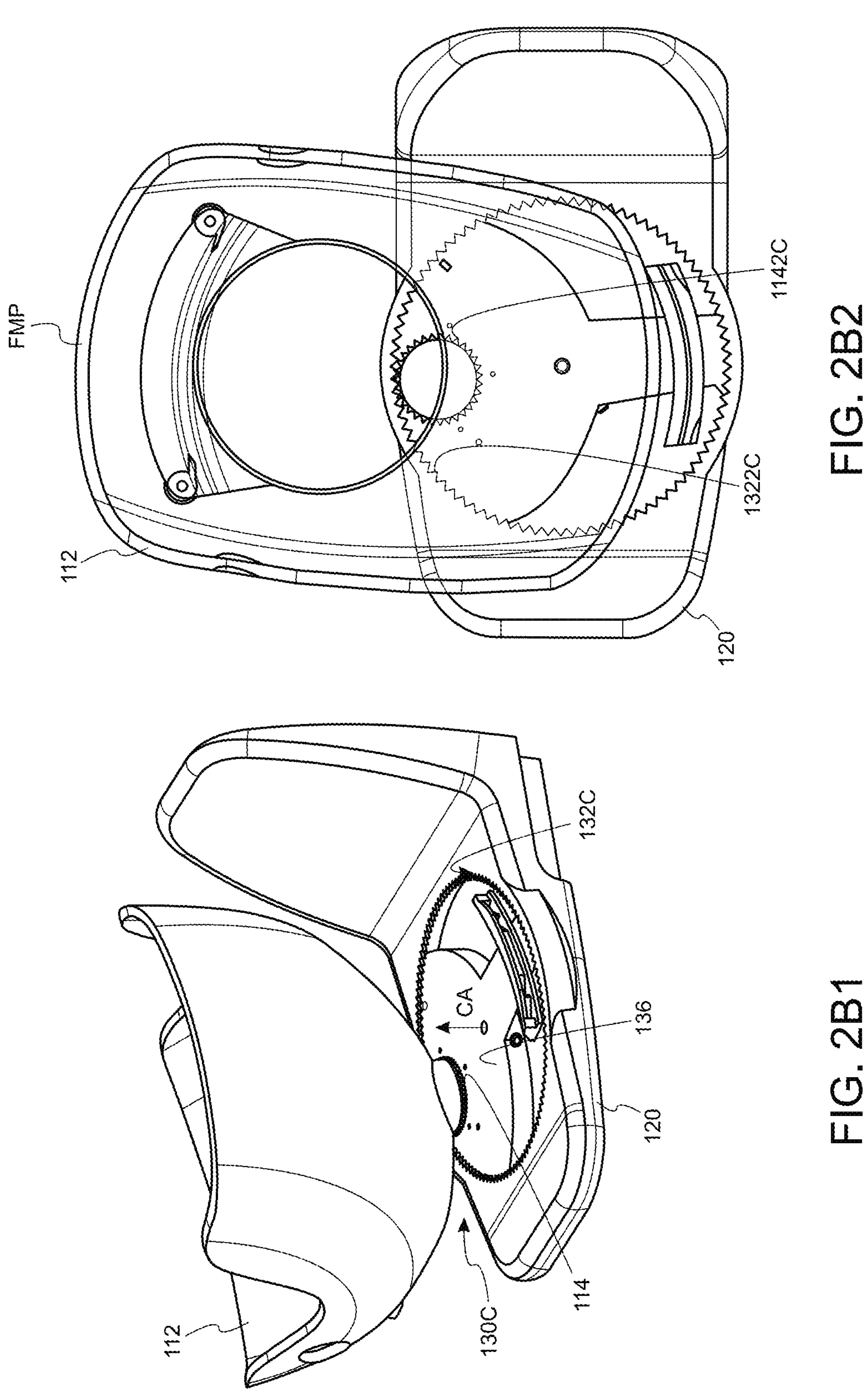
FIG. 2B2
FIG. 2B1

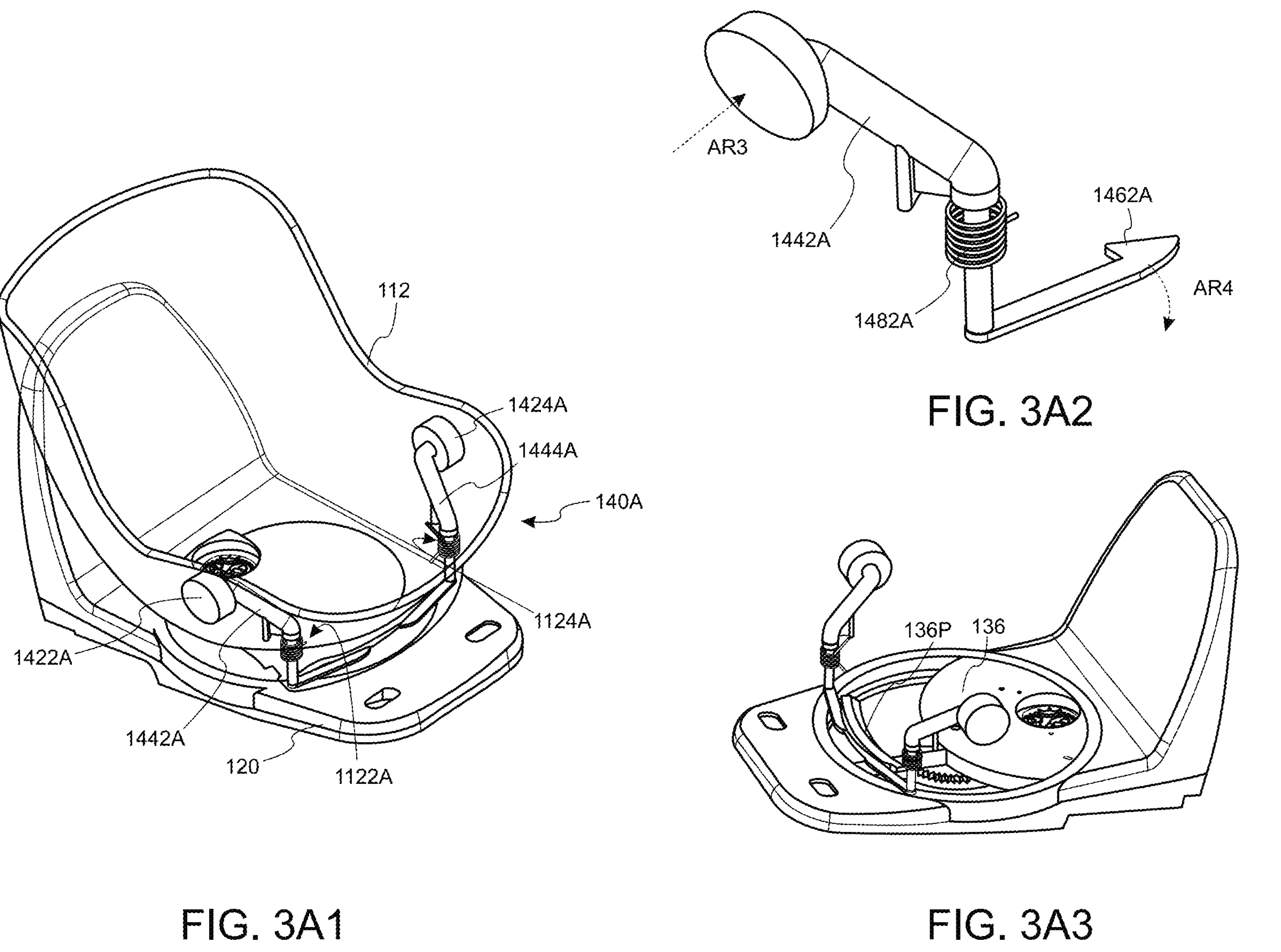
FIG. 3A1
FIG. 3A2
FIG. 3A3

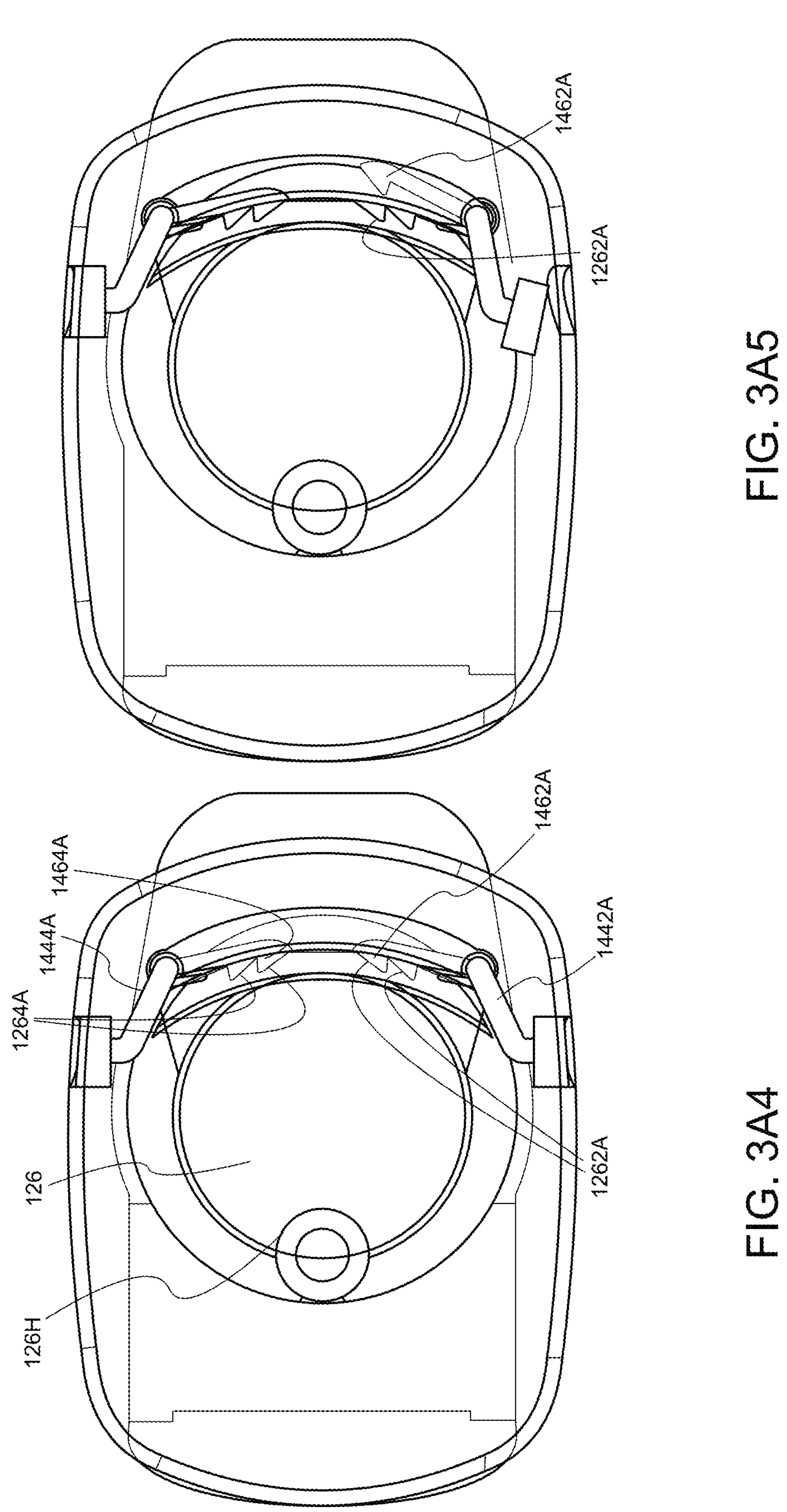
1462A
1262A
FIG. 3A5
1464A
1462A
1444A
1442A
1264A
126
1262A
126H
FIG. 3A4

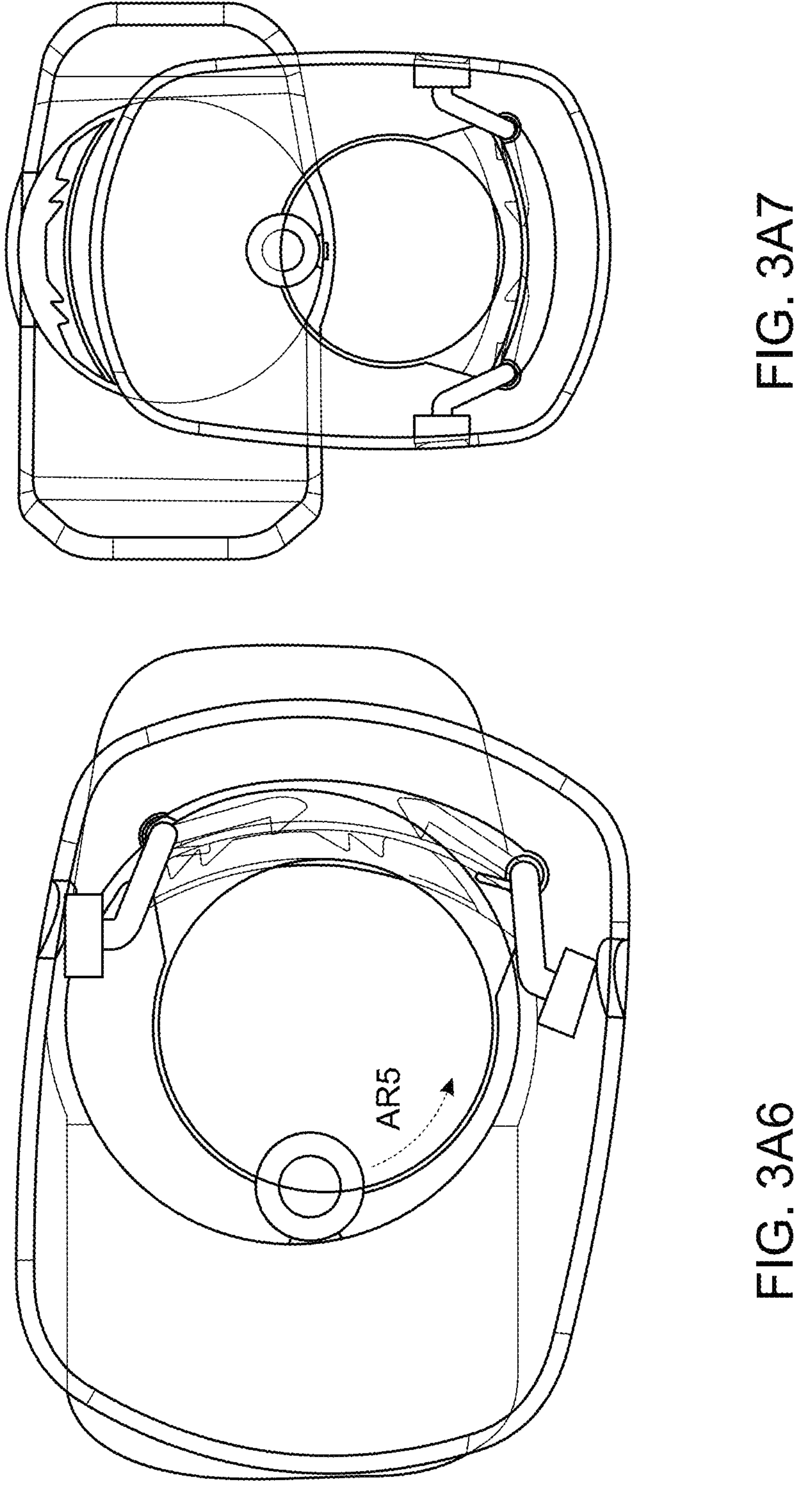
FIG. 3A7
FIG. 3A6

158
122
120

150
126
136

154
150
152

CAR SAFETY SEAT

TECHNOLOGICAL FIELD

The presently disclosed subject matter is in the field of car safety and relates to car safety seats, specifically seats for safely accommodating a child.

BACKGROUND

Car safety seats are designed to protect children and support them in a safe way while in a car. These seats are typically mounted over an existing car seat, either front-facing, in the direction of travel, or rear-facing.

Most safety seats are fixed. Positioning the safety seat in the car can be a cumbersome and heavy task. Frequently, the child caretaker bends and arches his/her back in order to properly position or remove the child from the safety seat located inside the car.

Some safety seats are rotatable. When the seat is rotated in the direction of the rear door, inserting/pulling the seat and positioning/removing the child is made easier. However, the child caretaker may still need to bend/arch his/her back to reach the seat/child.

GENERAL DESCRIPTION

The presently disclosed subject matter provides rotatable safety seats, specifically for use in a car. The described rotatable safety seats alleviate the need of a child caretaker to bend or arch his/her back during inserting and pulling the seat into and out of the car, or during positioning and removing the child in and from the seat. Also, the described rotatable safety seats are easy to manufacture, possess extra safety measures, are reliable and hard to break down.

According to a first aspect, there is provided a rotatable car safety seat comprising:

- an upper portion comprising a seat having a frontmost point and configured for accommodating a child and a seat rotational element having a fixed connection to the seat, such that it is rotatable together with seat about a seat rotational axis;
- a lower portion configured for being mounted to a passenger's seat of a car having a longitudinal direction and having a central axis spaced from the seat rotational axis; and
- a movement mechanism connected to the seat rotational element and operable to translate rotation of the seat rotational element about the seat rotational axis into movement of the seat rotational element along a circular trajectory around the central axis, and vice versa; thereby ensuring that when the seat is caused by a user to turn, the seat together with the seat rotational element is eccentrically moved relative to the central axis, and is simultaneously rotated about the seat rotational axis thereby continuously changing a distance between the frontmost point of the seat and the central axis.

The rotatable car safety seat is configured to rotate/swivel about the central axis of the lower portion, sometimes referred to as the base, to a predetermined position on the plane defined by the passenger's seat (in particular, parallel to the ground). Rotation of the seat about the central axis is frequently referred to herein as eccentrical rotation. The predetermined position may be any one of the front-facing orientation, the rear-facing orientation, the side-facing orientation (sometimes referred to as the right-angle orientation, towards one of the rear doors), or any other angular orientation, all with respect to the driving direction which is the same as the direction of the longitudinal axis of the lower portion and/or the longitudinal direction of the car.

While the safety seat is rotated to the side-facing orientation, the safety seat also rotates about the seat rotational axis, thereby changing the distance between the frontmost point of the seat and the central axis. In other words, the rotation about the seat rotational axis results in deviating orientation of the seat, specifically orientation of center of the viewing field of a person sitting on the seat, from the central axis, and directing the seat towards the rear door of the car. In other words, the safety seat moves outwardly, in the lateral direction relative to the longitudinal axis of the lower portion, thereby getting closer to the rear door. This allows the child caretaker to easily handle the seat/child without having to excessively bend and arch the back.

The movement mechanism can be operable for simultaneous rotation of the upper portion and the seat about both the central axis and the seat rotational axis. The rotation of the seat with the seat rotational element about the central axis (the eccentrical rotation) translates into concurrent rotation of the seat with the seat rotational element about the seat rotational axis, and vice versa. The characteristics of rotational movements about the two axes, such as their angular speeds, may be synchronized and have a specific relation therebetween. This, firstly, enables easy handling of the seat rotation/displacement by the caretaker by using one hand only and leaving the other hand for carrying the child. Secondly, this overcomes the need for excessive number of parts in the movement mechanism, which would have been required had the eccentric rotation and deviation of the seat from the central axis (when rotated about the seat rotational axis and changing distance between the frontmost point of the seat and the central axis) been performed by two sub-mechanisms in two separate actions. Thirdly, this enables producing light-weight movement mechanisms, as according to safety standards there is a weight limit for the safety seat. For example, according to some safety standards, the total weight of the safety seat is limited to 33 kilograms including the weight of a 15 kilograms child. Reducing the number of parts is also directly correlated with less faults and malfunctioning.

It is noted that while the rotatable car safety seat is exemplified herein with respect to a child car seat, this should not limit the presently disclosed subject matter and it may relate and be adapted to any type of child support, such as a car seat, booster seat, a carrycots, an infant car bed, an infant carrier, a child safety seat, an infant safety seat, a child restraint system, a restraining car seat, and may be adapted for any required weight and size of a child as well as a paralyzed individual. The described rotatable safety seat can be adapted for use with or without a safety belt of the vehicle and can be used in any type of vehicle and may be placed in any vehicle seat, such as in the front seat or back seat at any side or center. The rotatable safety seat can be structured to be compatible with any acceptable standards, such as the ISOFIX standard.

In some embodiments, the seat has a default orientation in which a line connecting the central axis and the seat rotational axis is parallel to the longitudinal direction of the car (e.g., front- or rear-facing orientation), and maximally turned orientation in which said line is perpendicular to the longitudinal direction of the car (e.g., side-orientation being right- or left-facing orientation). In some embodiments, the distance is maximal when the seat reaches its maximally turned orientation.

In some embodiments, the movement mechanism is operable to translate clockwise rotation of the seat rotational element about the seat rotational axis into counterclockwise movement of the seat rotational element along said circular trajectory around the central axis, and vice versa.

In some embodiments, at least a part of said movement mechanism is located between the seat rotational axis and the central axis.

In some embodiments, the lower portion comprises a cavity accommodating at least a part of said movement mechanism.

In some embodiments, the cavity accommodates at least a part of said seat rotational element.

In some embodiments, the movement mechanism is operable so that a user can cause the seat to turn by manually pulling the seat.

In some embodiments, the movement mechanism consists of at least one rotatable element.

In some embodiments, the seat rotational element and said movement mechanism form a gear assembly.

In some embodiments, the movement mechanism consists of at least two rotatable elements comprising a central gear having its axis coinciding with the central axis and a fixed position to the lower portion at least when the movement mechanism is operable, and an intermediate gear rotatably engaging with each of the central gear and the seat rotational element.

In some embodiments, the movement mechanism comprises a peripheral ring having its axis coinciding with the central axis and a fixed position to the lower portion at least when the movement mechanism is operable, the peripheral ring being formed with inner cogs that mesh with outer side of the seat rotational element.

In some embodiments, the movement mechanism comprises a central wheel having its axis coinciding with the central axis and a fixed position to the lower portion at least when the movement mechanism is operable, and a belt connecting between the seat rotational element and the central wheel such that rotating the seat with seat rotational element eccentrically relative to the central axis causes the belt to move and affect the rotation of the seat rotational element and the seat about the seat rotational axis.

In some embodiments, the rotatable car safety seat comprises a soft locking mechanism operable to stabilize the seat at predefined orientation angles along the circular trajectory, while the seat is rotated.

In some embodiments, the rotatable car safety seat comprises a locking mechanism operable to immobilize the seat with the seat rotational element to the lower portion, the locking mechanism being configured to at least unlock the seat rotational element from the lower portion and enable rotation of the seat with the seat rotational element relative to the lower portion.

In some embodiments, the locking mechanism is operable to selectively enable:

- a first unlocked state in which the movement mechanism is operable to enable the rotational movement of the seat with the seat rotational element about the central rotational axis of the lower portion while the locking mechanism prevents the rotational movement of the seat with the seat rotational element about the seat rotational axis, and
- a second unlocked state in which the seat with the seat rotational element is free to rotate about the seat rotational axis and the movement mechanism is operable to translate the rotational movement of the seat with the seat rotational element about the seat rotational axis into the rotational movement of the seat with the seat rotational element about the central rotational axis and vice versa.

In some embodiments, the locking mechanism is configured to enable rotation of the seat with the seat rotational element relative to the lower portion in one direction at a time while preventing the rotation of the seat with the seat rotational element relative to the lower portion in the opposite direction.

According to a second aspect, there is provided a rotatable car safety seat comprising:

- an upper portion comprising a seat configured for accommodating a child;
- a lower portion configured for being mounted to a passenger's seat of the car;
- a movement mechanism operable to enable rotation of the upper portion relative to the lower portion; and
- a locking mechanism operable to immobilize the upper portion to the lower portion, the locking mechanism being configured to unlock the seat from the lower portion and enable rotation of the seat relative to the lower portion in one direction at a time while preventing the rotation of the seat relative to the lower portion in the opposite direction.

Safety of the child, other passengers sitting beside the child and the caretaker is of utmost importance. The rotatable safety seat is equipped with a locking mechanism that prevents sudden and unintended rotation in a direction that the caretaker did not want while acting to rotate the seat in the desired direction.

According to a third aspect, there is provided a rotatable car safety seat comprising:

- an upper portion comprising a seat configured for accommodating a child and a seat rotational element fixedly connected to the seat so as to be able to rotate therewith about a seat rotational axis;
- a lower portion configured for being mounted to a passenger's seat of the car and having a central rotational axis spaced from the seat rotational axis;
- a movement mechanism connected to the seat rotational element and to the lower portion and operable to enable a rotational movement of the seat with the seat rotational element about the seat rotational axis and a rotational movement of the seat with the seat rotational element about the central rotational axis; and
- a locking mechanism configured to at least indirectly lock the movement mechanism and operable to selectively enable:
  - a first unlocked state in which the movement mechanism is operable to enable the rotational movement of the seat with the seat rotational element about the central rotational axis of the lower portion while the locking mechanism prevents the rotational movement of the seat with the seat rotational element about the seat rotational axis, and
  - a second unlocked state in which the seat with the seat rotational element is free to rotate about the seat rotational axis and the movement mechanism is operable to translate the rotational movement of the seat with the seat rotational element about the seat rotational axis into the rotational movement of the seat with the seat rotational element about the central rotational axis and vice versa.

Occasionally, a caretaker sitting beside the child, e.g. during a ride, would like to take care of the child. Being able to rotate the seat such that the child is in right angle orientation with respect to the longitudinal axis of the lower portion and to the caretaker, while not extending outwardly towards the rear door, can be advantageous. Also, this rotational movement about only the central axis of the lower portion can be helpful when it is raining, so that the child does not get wet during the act of taking him/her out of the car.

In some embodiments, the movement mechanism comprises a rotatable unit having a unit rotational axis aligned with the central rotational axis, said locking mechanism being operable to lock the rotatable unit to prevent its rotation relative to the lower portion in said second unlocked state and to unlock the rotatable unit from the lower portion in said first unlocked state.

In some embodiments, the locking mechanism comprises right and left handle arms configured to lock the rotatable unit to the upper portion, the handle arms being terminated with release buttons located respectively at the right and left sides of the seat, pressing the respective release button releases the upper portion from the rotatable element and enables the rotation of the seat with seat rotational element both about the central rotational axis and about the seat rotational axis in the respective direction by pulling the seat in the respective side. Each of the right and left handle arms may engage at its lower side with at least one tooth formed in the rotatable unit in a way such that the upper portion is locked to the rotatable unit in the respective direction while being free to slide relative to the rotatable unit in the opposite direction once the other handle arm is released.

In some embodiments, the locking mechanism comprises at least one lever arm configured to lock the rotatable unit to the lower portion, the lever arm being terminated with a switch button located at the lower portion, pressing the switch button releases the rotatable unit from the lower portion and enables the rotation of the upper portion together with the rotatable unit about the central rotational axis of the lower portion. The at least one lever arm may comprise right and left lever arms being terminated with right and left switch buttons respectively, pressing the respective switch button enables the rotation of the upper portion about the central rotational axis to the respective side only. Each of the right and left lever arms may engage at its inner side with at least one tooth formed in the rotatable unit in a way such that the rotatable unit is locked to the lower portion in the respective direction while being free to rotate about the central rotational axis in the opposite direction once the other lever arm is released.

In some embodiments, the locking mechanism comprises a ratchet assembly.

In some embodiments, at least a part of the movement mechanism is located between the seat rotational axis and the central axis.

In some embodiments, the seat rotational element and the movement mechanism form a gear assembly.

In some embodiments, the gear assembly comprises the rotatable unit, the seat rotational element and a transition gear connected between the rotatable unit and the seat rotational element, such that in the second unlocked state rotating the upper portion clockwise about the central rotational axis results in rotating the seat anti-clockwise about the seat rotational axis.

In some embodiments, the seat is configured to be firstly oriented along a longitudinal axis of the lower portion, either in driving direction or against driving direction.

In some embodiments, the movement mechanism is operable to rotate the seat at a substantially right angle relative to a longitudinal axis of the lower portion.

In some embodiments, the movement mechanism is operable to rotate the upper portion both about the central axis and about the seat rotational axis, by manually pulling the seat to either side.

In some embodiments, the movement mechanism is operable to synchronize between the eccentrical displacement of the seat and the distance changing between the frontmost point of the seat and the central axis (orientation deviation of the center of the viewing field of a person located on the seat).

In some embodiments, the movement mechanism consists of round elements operable to cause the eccentrical displacement of the seat and the orientation deviation of the seat, to change the distance between the frontmost point of the seat and the central axis.

In some embodiments, the movement mechanism comprises a central gear having its axis coinciding with the central axis and having at least a first fixed position relative to the lower portion, and an intermediate transition gear engaging with the central gear and said seat rotational element.

In some embodiments, the movement mechanism comprises a peripheral ring having its axis coinciding with the central axis and having a fixed position relative to the lower portion, the peripheral ring being formed with inner cogs that mesh with outer side of the seat rotational element.

In some embodiments, the movement mechanism comprises a central wheel having its axis coinciding with the central axis and having at least a first fixed position relative to the lower portion, and a belt connecting between the seat rotational element and the central wheel such that rotating the upper portion eccentrically relative to the central axis causes the belt to move and affect the rotation of the seat rotational element about the seat rotational axis.

In some embodiments, the rotatable car safety seat comprises a soft locking mechanism operable to stabilize the seat at predefined orientation angles, while the seat is rotated, relative to a longitudinal axis of the lower portion.

While being specifically described in connection with a child car safety seat, it is well appreciated that the presented subject matter is not limited thereto and can be practiced with other rotatable/swivelable seats, such as general rotatable seats both in and outside the car.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A-1L2 illustrate a first non-limiting example of a rotatable car safety seat configured in accordance with the presently disclosed subject matter;

FIGS. 2A1-2B2 illustrate non-limiting examples of movement mechanisms incorporated in a rotatable car safety seat and configured for eccentrical rotation and orientation deviation of the seat by changing the distance of the frontmost point of the seat from the central axis, according to the presently disclosed subject matter;

FIGS. 3A1-3A7 illustrate a non-limiting example of a locking system incorporated in a rotatable car safety seat according to the presently disclosed subject matter;

DETAILED DESCRIPTION OF EMBODIMENTS

In accordance with a first aspect of the presently disclosed subject matter, there is provided a rotatable car safety seat comprising:

- an upper portion comprising a seat having a frontmost point and configured for accommodating a child and a seat rotational element having a fixed connection to the seat, such that it is rotatable together with seat about a seat rotational axis;
- a lower portion configured for being mounted to a passenger's seat of a car having a longitudinal direction and having a central axis spaced from the seat rotational axis; and
- a movement mechanism connected to the seat rotational element and operable to translate rotation of the seat rotational element about the seat rotational axis into movement of the seat rotational element along a circular trajectory around the central axis, and vice versa; thereby ensuring that when the seat is caused by a user to turn, the seat together with the seat rotational element is eccentrically moved relative to the central axis, and is simultaneously rotated about the seat rotational axis thereby continuously changing a distance between the frontmost point of the seat and the central axis.

Figure 1B:
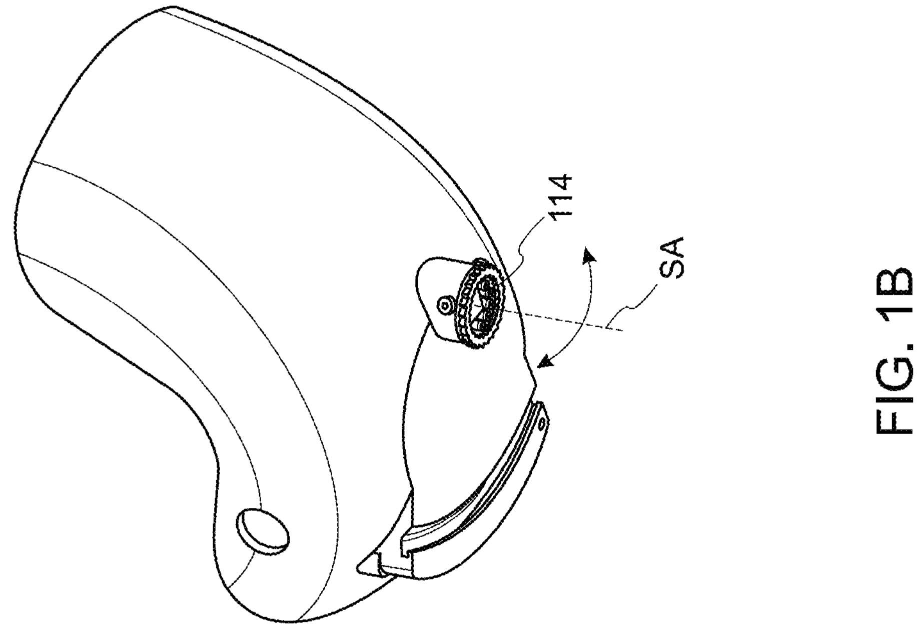
Figure 1A:
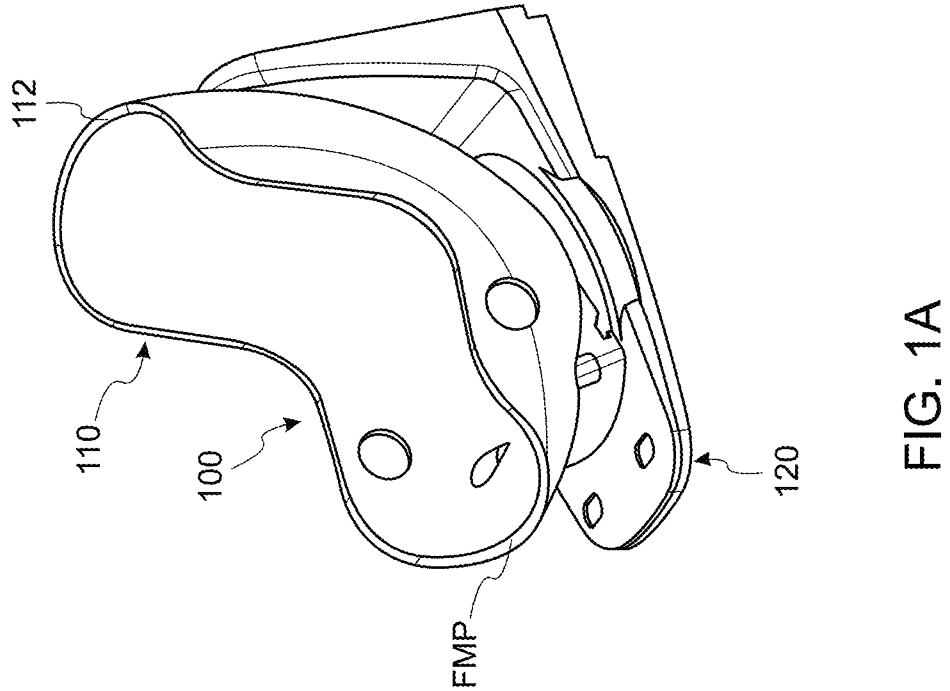

Reference is made to FIGS. 1A-1L2 illustrating a first non-limiting example of a rotatable car safety seat 100 configured in accordance with the presently disclosed subject matter.

As shown, the rotatable seat 100 includes an upper portion 110, a lower portion 120 and a movement mechanism 130 operable to enable the rotation of the rotatable seat.

As specifically shown in FIGS. 1A and 1B, the upper portion 110 includes a seat 112 and a seat rotational element 114. The seat 112 has a frontmost point FMP and is configured for accommodating a child therein. The seat rotational element 114 is fixedly connected to the seat 112, at the bottom side of the seat, so that it rotates together with the seat as one part when the seat is caused to rotate by a user, as will be described further below. The seat 112 with the seat rotational element 114, attached thereto, are rotatable about a seat rotational axis SA that is typically the symmetrical axis of the seat rotational element 114. Therefore, being fixedly attached to each other, whenever it is mentioned that the seat is rotated/rotates the same movement applies to the seat rotational element, and vice versa.

The lower portion 120 is configured to be mounted to a passenger's seat, of a car having a longitudinal direction (being the direction of travel), such as the rear seat of the car. As shown in FIG. 1G, the lower portion 120 has a central axis CA that is spaced from the seat rotational axis SA, a longitudinal axis LOA and a lateral axis LAA. The central axis CA can be a symmetrical axis of the lower portion 120 but not necessarily. The longitudinal axis LOA is a symmetrical axis passing along the length of the lower portion and typically overlaps with the longitudinal direction of the car. The lateral axis LAA is orthogonal to the longitudinal axis LOA and are both located in and define a horizontal plane substantially parallel to a plane defined by the car's passenger's seat where the lower portion 120 is mounted.

The rotatable car safety seat 100 includes a movement mechanism that is connected to the seat rotational element 114 and operable to rotate the seat rotational element 114, and the seat 112, in the horizontal plane.

Figure 1D:
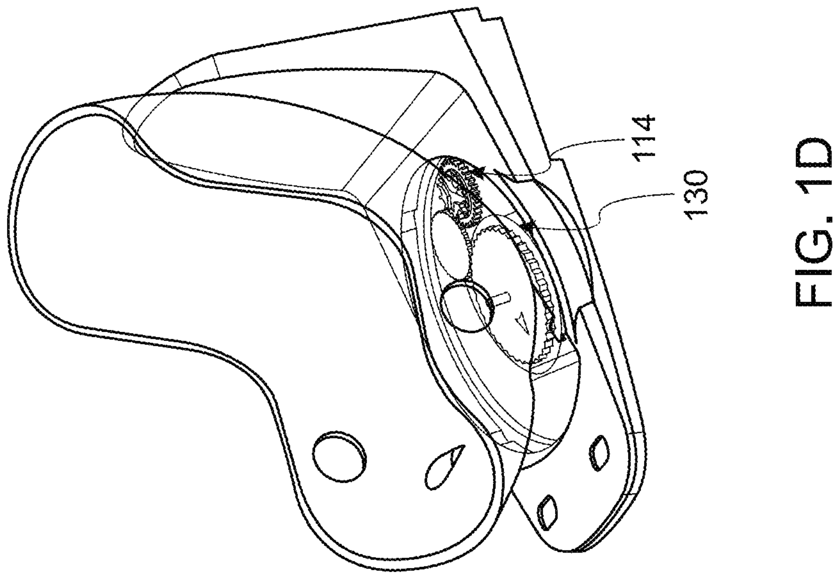
Figure 1C:
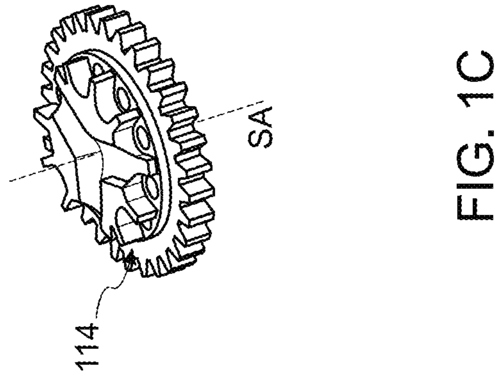
Figures 1E, 1F:
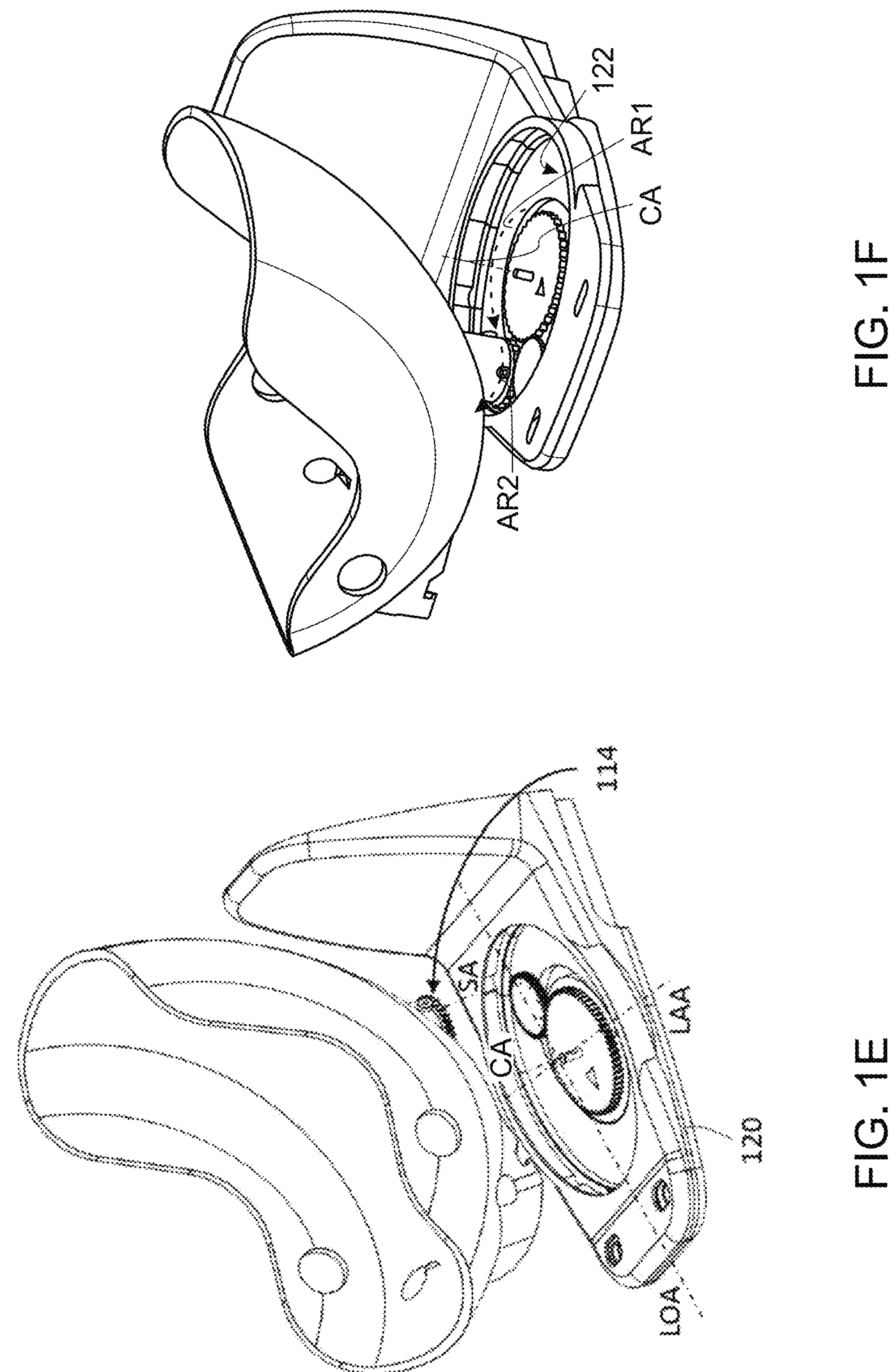

As appreciated, for example in FIG. 1D, the seat 112 and other parts that will be described below, are shown transparent in order to reveal the seat rotational element 114 and the movement mechanism 130 connected to the seat rotational element 114 while both are located underneath the seat 112. It is noted that the movement mechanism can be configured in a variety of ways, as will be described further below with reference to FIGS. 2A-2B. A first non-limiting example of the movement mechanism, referenced to as movement mechanism 130A, is described in FIGS. 1A-1L.

As shown in FIGS. 1G1-1G4, typically the rotatable car safety seat 100 is initially oriented front-facing (as shown in FIG. 1G1) or rear-facing (as shown in FIG. 1G2), with respect to the longitudinal direction of the car (the driving direction), that basically coincides with the longitudinal axis LOA direction.

The movement mechanism is operable to rotate the seat (and the seat rotational element 114) eccentrically about the central axis CA. So, as can be seen in FIG. 1H, for example, in comparison with FIG. 1D, the seat rotational element 114, and the seat 112 that is fixedly connected thereto, is displaced by being rotated counterclockwise with respect to the central axis CA, as illustrated by arrow AR1. If this is the only rotational movement occurring, then the seat would be oriented towards out of the paper, e.g. towards the left rear door of the car, facing the central axis CA. However, as also mentioned, the movement mechanism is also operable to rotate the seat rotational element 114, and the seat 112 fixedly connected thereto, at least when both are rotated, clockwise as illustrated by arrow AR2, such that the seat 112 faces a way from the central axis CA, for example towards the right rear door of the car.

The movement mechanism is operable to rotate the seat and the seat rotational element for a full circle, i.e. for 360 degrees. While the seat rotational element is rotated eccentrically about the central axis CA for 360 degrees clockwise/counterclockwise, the seat is centrically rotated, in addition to its eccentrical rotation, about the seat rotational axis SA for 360 degrees counterclockwise/clockwise. In particular, the movement mechanism is operable to rotate the seat either towards the right rear door (a right side-facing position, as shown, for example, in FIGS. 1F and 1G3)) or towards the left rear door (a left side-facing position, as shown, for example, in FIG. 1G4). Each of the positions in FIGS. 1G3 and 1G4 can be reached by starting from either the front-facing position or the rear-facing position shown in FIGS. 1G1 and 1G2 respectively. Therefore, the movement mechanism is operable to rotate the seat for a substantially right angle (90 degrees, towards either one of the rear doors), relative to the longitudinal direction of the car and the longitudinal axis of the lower portion.

Figure 1I:
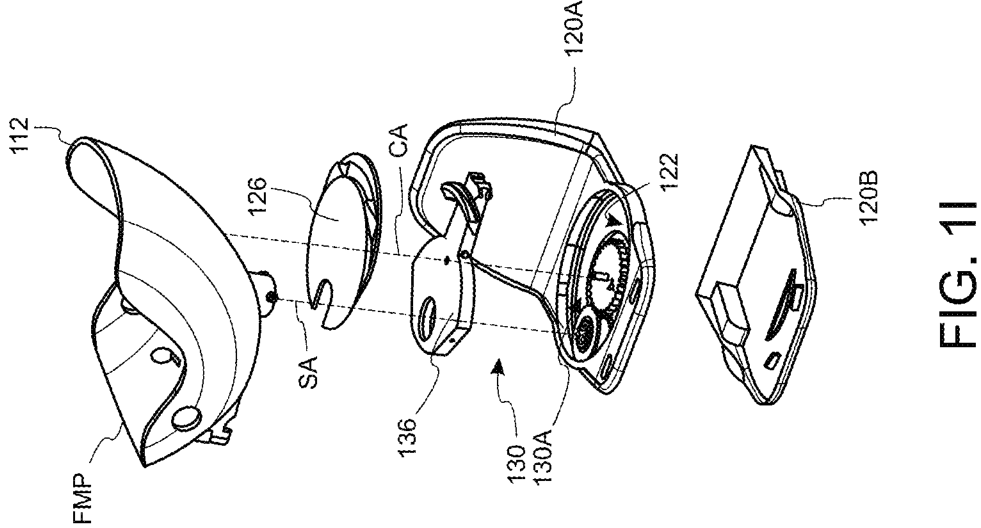
Figure 1H:
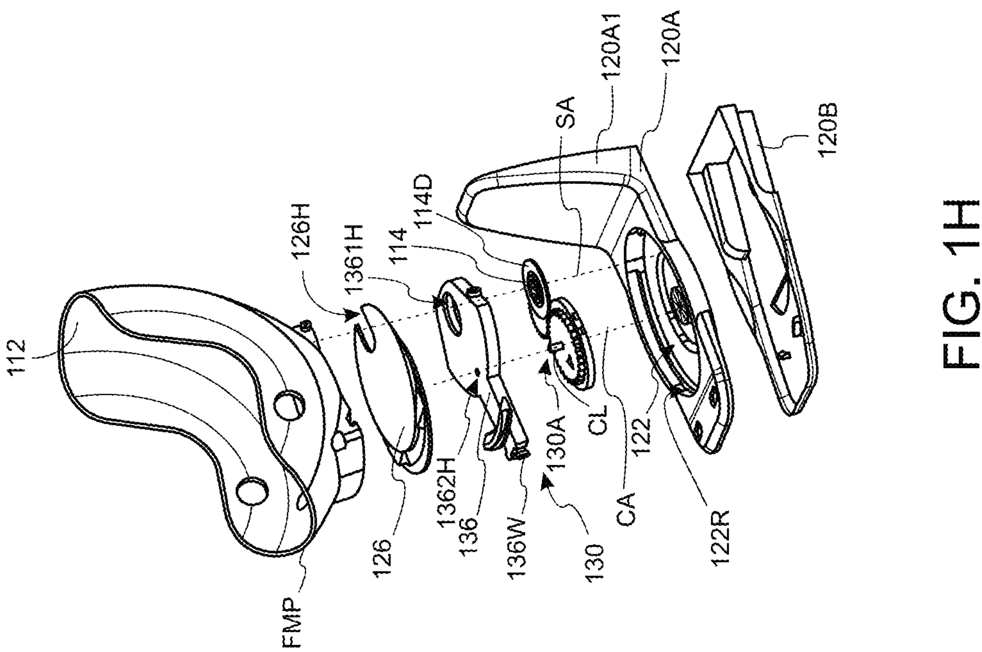

Exploded views showing the main components of the rotatable seat 100 are shown in FIGS. 1H and 1I relating to a default, front-facing orientation and right-side orientation of the seat, respectively. As shown, the rotatable seat assembly includes (from down up): the lower portion 120 including a lower base 120B and an upper base 120A, a cavity 122 formed in the upper base 120A configured for accommodating the movement mechanism 130, the movement mechanism 130 including a first configuration 130A and a mid-rotation unit 136, the seat rotational element 114 connected to the movement mechanism 130A, a rotatable cover 126 and the seat 112 having a front-most point FMP.

The upper base 120A includes a back portion 120A1 that is configured to rest against the back of the passenger's seat. The upper base also includes the cavity 122 that accommodates at least a part of the movement mechanism 130A The upper base 120A may also include a cavity accommodating the seat rotational element 114. The cavity(ies) keep(s) the movement mechanism and/or the seat rotational element hidden and out of reach for passengers, thereby providing safety to both the passengers on one side and the movement mechanism/seat rotational element on the other side. Specifically, as in the presently described example, the upper base 120 has the single cavity 122 accommodating the seat rotational element 114 as well as the movement mechanism 130A. A locking disk 114D is placed above the seat rotational element 114 and portions of the movement mechanism 130A, in order to maintain their spatial positions with respect to each other inside the cavity 122.

The mid-rotation unit 136 sits above the seat rotational element 114 and the movement mechanism 130A. The mid-rotation unit 136 has a first hole 1361H through which the seat rotational element 114 passes to be connected to the seat 112 at its upper side and to the movement mechanism 130A at its lower side. a second hole 1362H in the mid-rotation unit 136 connects to a central locus CL located on the central axis CA. Accordingly, the mid-rotation unit 136, specifically the nominal distance between the holes 1361H and 1362H, defines the distance between the seat rotational axis SA and the central axis CA, and as a result defines a circular trajectory of the location of the seat rotational axis SA where the location of the central axis CA is the center of the circular trajectory. As shown, the mid-rotation unit 136 includes at the peripheral, outer side a plurality of the wheels 136W that facilitate and/or stabilize the rotation of the mid-rotation unit 136 inside the cavity 122, the wheels 136W run at defined route(s) 122R along the outer side of the cavity. It is noted that the structure of the mid-rotation unit is not necessarily as shown and other shapes can be equally used. In one, simple example, the mid-rotation unit has an arm/beam/rod shape with pass-through holes enabling connecting the mid-rotation unit to a central locus located at the central axis and to the seat rotational element at the seat rotational axis. The mid-rotation unit may extend to the cavity periphery and have one or more wheels running along a predefined circular route at the cavity periphery.

The cover 126 is configured to safely hide the movement mechanism inside the cavity in the upper base. The cover also has a hole 126H that allows connecting the seat rotational element 114 to the seat 112.

It is appreciated from FIG. 1I, that the mid-rotation unit 136 and the cover 126 turn counterclockwise together with the seat rotational element 114 when the seat 112 is turned to the right-side. As also noted, the seat rotational axis SA moved together with the seat rotational element 114 and the seat 112 along the circular trajectory.

The movement mechanism is configured to be operated manually, by hand. Specifically, the movement mechanism enables the user to rotate the seat 112 and the seat rotational element 114 by manually pulling the seat towards himself/herself. The movement mechanism is also configured for one-hand operation. The user pulls the seat by one hand in order to pull and rotate the seat at the same time, similar to the action of opening the car door. This frees the second hand so that the user can carry the child and put him on the seat or take him out of the seat and rotate the seat backwardly into its default, front-facing or rear-facing, position.

Figures 1J, 1K:
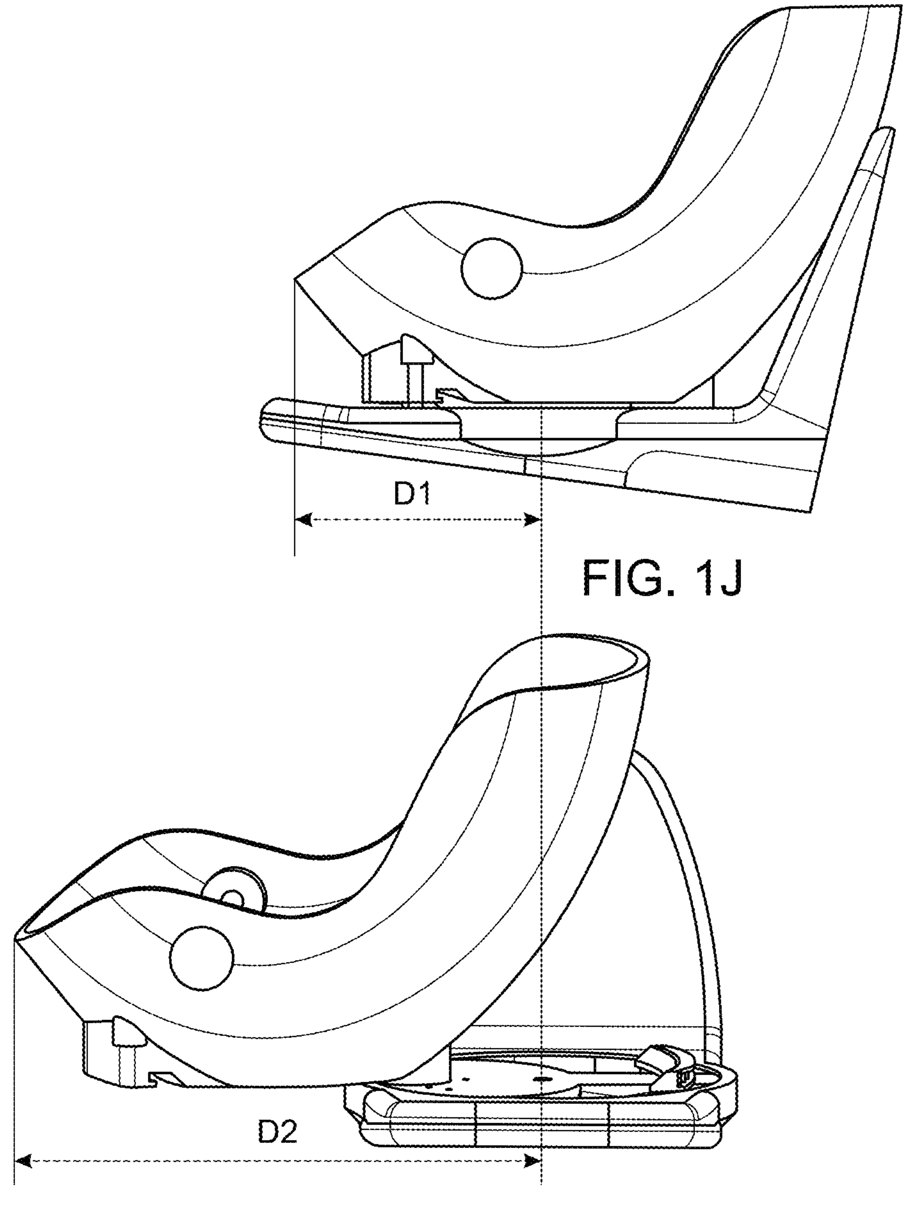

The movement mechanism is connected to the seat rotational element 114 and operable to translate rotation of the seat rotational element 114 about the seat rotational axis SA into movement of the seat rotational element 114 along the circular trajectory around the central axis CA, and vice versa. In other words, the movement mechanism also translates moving the seat rotational element 114 along the circular trajectory around the central axis CA into rotation of the seat rotational element 114 about the seat rotational axis SA. By this, the movement mechanism ensures that when the seat 112 is caused by a user to turn, the seat 112 together with the seat rotational element 114 are eccentrically moved relative to the central axis CA (along the circular trajectory), and are simultaneously rotated about the seat rotational axis SA thereby continuously changing a distance between the frontmost point FMP of the seat and the central axis CA. This is illustrated, for example, in FIGS. 1J and 1K, representing the front-side and right-side facing orientations respectively. As shown in FIG. 1J, the distance between the frontmost point FMP and the central axis CA is D1, and as shown in FIG. 1K, the distance between the frontmost point FMP and the central axis CA is D2 that is larger than D1. In fact, the maximal distance between the frontmost point FMP and the central axis CA is when the seat is in the right-side or left-side orientations, and the minimal distance is when the seat is in the front-side or rear-side orientations.

As appreciated, the movement mechanism is operable to rotate the seat with the seat rotational element both about the central axis CA, thereby displacing the seat with the seat rotational element eccentrically relative to the central axis CA, and about the seat rotational axis SA, thereby deviating orientation of the seat from the central axis CA, when the seat is located at any point along the circular trajectory between the front-facing and a rear-facing orientations. Accordingly, the movement mechanism is configured to synchronize between the eccentrical displacement relative to the central axis CA and the orientation deviation of the seat, i.e. changing a distance between the frontmost point of the seat and the central axis. The eccentrical rotation about the central axis CA and the centrical rotation about the seat rotational axis SA, of the seat, are operated simultaneously in a synchronized manner. The eccentrical rotation affects the centrical rotation and vice versa. Both rotation movements are interconnected and synchronized. This feature makes the manual pulling and rotating of the seat by one hand and in one action even easier.

In some embodiments, the movement mechanism includes round elements operable to cause the eccentrical displacement of the seat relative to the central axis and changing the distance between the frontmost point of the seat and the central axis. In particular, the movement mechanism includes only round, symmetrically rotatable, elements. This configuration enables easier manufacturing as well as more robust construction and performance. Accordingly, the eccentrical displacement and orientation deviation of the seat are achieved by rotational movements of the movement mechanism's elements, specifically by circular rotational movements that affect angular as well as lateral displacement of the seat front edge or a central point for example. This is the case with the movement mechanism 130A shown in FIGS. 1A-1L.

In FIG. 1L1, the seat is in front-facing position, and in FIG. 1L2 the seat is rotated 90 degrees to the right. The movement mechanism 130A includes a gear assembly that includes a first, central gear 132A and a second, lateral gear 134A connected thereto. The second gear 134A is connected to the seat rotational element 114 which is in this example configured as a gear as well. Basically, all three gears are located in a plane that is substantially horizontal and parallel to the lower portion's plane. The central gear 132A has a central axis coinciding with the central axis CA and it is stationary such that it does not rotate, i.e. it has a fixed position relative to the lower portion 120. The second gear 134A functions as an intermediate gear that is engaged with the central gear 132A and with the seat rotational element 114. As appreciated, when the seat rotational element 114 rotates clockwise, the second gear 134A rotates counterclockwise, and vice versa. Similarly, when the second gear 134A rotates counterclockwise, the seat rotational element rotates clockwise. As the first, central gear 132A is stationary the second gear 134A will slide over the first gear 132A in the counterclockwise direction with respect to the central axis CA thereby rotating eccentrically with respect to the central axis CA in the counterclockwise direction. This results in the seat rotational element 114 getting closer to the right rear door of the car until the seat rotational element passes π/2 radians, as exemplified in FIG. 1L2. The movement mechanism 130A enables a synchronous movement both eccentrically about the central axis CA and centrically about the seat rotational axis SA. In one specific example, the ratio between the two rotational movements is 1:2, i.e. for each eccentrical angular displacement X of the seat with the seat rotational element relative to the central axis, the seat rotates for angle of 2× about the seat rotational axis. This can be achieved by providing the first gear having twice the diameter with respect to the second gear and the seat rotational element.

While the example described in FIGS. 1L1-1L2 employs three gears that interact between each other to enable the simultaneous eccentrical and centrical (self) rotational movements of the seat, it is appreciated that more than three gears can be used some of which are used intermediately between the seat rotational element and the central gear, mainly for synchronizing the rotational movements between the different gears such that when the seat is pulled to the right side (from the starting position looking in the front direction), the seat rotates clockwise centrically, about the seat rotational axis, and anticlockwise eccentrically, about the central axis, and vice versa when being pulled to the left side. In a non-limiting example, the movement mechanism includes four gears, in which the seat rotational element has inner cogs that mesh with outer cogs of a second gear that mesh with outer cogs of a third gear that mesh with outer cogs of the central gear.

As described above, the seat has a typically front-side or rear-side facing orientations, with respect to the driving direction. In other words, the default orientation is that in which a line connecting the central axis and the seat rotational axis is parallel to the longitudinal direction of the car.

Additionally, the seat has a maximally turned orientation in which the above-mentioned line is perpendicular to the longitudinal direction of the car. In other words, the maximally turned orientation is when the seat is in the right-side or left-side orientations. When the seat is in the maximally turned orientation, the distance between the frontmost point FMP of the seat and the central axis CA is maximal.

As already mentioned, the movement mechanism translates clockwise rotation of the seat rotational element and the seat about the seat rotational axis into counterclockwise movement of the seat rotational element and the seat along the circular trajectory around the central axis, and vice versa.

Reference is now made to FIGS. 2A-2B illustrating different non-limiting examples of the movement mechanism of the rotatable car safety seat of the presently disclosed subject matter. It is noted that while not necessarily specifically shown in all figures, the cover and the mid-rotation unit can be used with the rest of the movement mechanisms shown. FIGS. 2A1-2A2 illustrate a second non-limiting example of a movement mechanism 130B configured in accordance with the presently described subject matter. As seen in the figures, the bottom side of the upper portion including the seat 112 and the seat rotational element 114 that is fixedly connected to the seat 112 so as to rotate together with the seat about the seat rotational axis SA are shown. As also seen, the cover 126 and the mid-rotation unit 136 are shown and located between the seat 112 and the seat rotational element 114. and the movement mechanism 130B includes a central wheel/gear 132B positioned inside the cavity in the lower portion 120, similarly to the central gear 132A in the movement mechanism 130A, and having its central axis aligned with the central axis CA and it is stationary such that it does not rotate during the eccentrical rotation of the seat 112 and seat rotational element 114 about the central axis CA, i.e. it has a fixed position relative to the lower portion 120.

The central wheel 132B and the seat rotational element 114 are connected by a timing belt 134B, as shown specifically in FIG. 2B2. All three elements (seat rotational element, central wheel and timing belt) are located in a plane that is substantially horizontal and parallel to the lower portion's plane.

As can be appreciated, rotating the seat 112 with the seat rotational element 114 eccentrically relative to the central axis CA causes the timing belt 134B to move and affect the rotation of the seat rotational element 114, and the seat 112, about the seat rotational axis SA, and vice versa. In other words, it works the opposite way, such that when rotating the seat with the seat rotational element about the seat rotational axis SA, the timing belt 134B starts to move and causes the eccentrical rotation of the seat about the central axis CA. Thereby ensuring that when the seat is caused by a user to turn, the seat together with the seat rotational element is eccentrically moved relative to the central axis, and is simultaneously rotated about the seat rotational axis thereby continuously changing the distance between the frontmost point FMP of the seat and the central axis CA, exactly as described above. CA As mentioned above, in some embodiments the diameter ratio between the seat rotational element 114 and the central wheel 132B is 1:2 for synchronizing the eccentrical movement about the central axis and the self, centrical movement about the seat rotational axis.

FIGS. 2B1-2B2 illustrate a third non-limiting example of a movement mechanism 130C configured in accordance with the presently described subject matter. As seen in the figures, a peripheral ring 132C, having its central axis coinciding with the central axis CA and having a fixed position relative to the lower portion 120, has inner cogs 1322C that mesh with cogs 1142C on outer side of the seat rotational element 114. When the seat, together with the seat rotational element 114, are rotated eccentrically about the central axis CA, assisted by the mid-rotation unit 136, the seat rotational element 114, and the seat 112, start to rotate also about the seat rotational axis due to the meshing between the inner and outer cogs on the peripheral ring 132C and the seat rotational element 114 respectively. Therefore, the seat with the seat rotational element are rotated eccentrically about the central axis CA and centrically about the seat rotational axis SA, thereby ensuring that when the seat is caused by a user to turn, the seat together with the seat rotational element is eccentrically moved relative to the central axis, and is simultaneously rotated about the seat rotational axis thereby continuously changing the distance between the frontmost point FMP of the seat and the central axis CA, exactly as described above. In some embodiments, the diameter ratio between the seat rotational element 114 and the peripheral ring 132C is 1:2 for synchronizing the eccentrical movement about the central axis and the self, centrical movement about the seat rotational axis.

In some embodiments, the rotatable car safety seat includes a locking mechanism operable to lock the seat to the lower portion. The locking mechanism is configured to selectively unlock the seat from the lower portion to enable rotation of the seat (together with the seat rotational element) relative to the lower portion.

Reference is made to FIGS. 3A1-3A7 illustrating a non-limiting example of a locking mechanism 140A configured in accordance with the presently described subject matter.

The locking mechanism 140A enables easy release of the seat 114 from the lower portion 120 by using one hand only. This frees the second hand for other actions, such as carrying the child. In the described example, unlocking the seat is easily operated by release buttons 1422A and 1424A located on the right and left sides of the seat 114. Each release button is pressed to release the seat from the lower portion and enable its pulling and rotation to one side. Accordingly, pressing the right button 1422A enables pulling and rotating the seat to the right, and pressing the left button 1424A enables pulling and rotating the seat to the left. In one particular example, as with the locking mechanism 140A, the locking mechanism is configured to enable pulling and rotation of the seat relative to the lower portion in one direction at a time while preventing the rotation of the seat relative to the lower portion in the opposite direction. This makes operating the seat safer.

As shown, the release buttons are connected to right and left handle arms 1442A and 1444A operable to lock the seat 112 to the lower portion 120 and unlock the seat from the lower portion 120. The handle arms pass through corresponding holes 1122A and 1124A in the seat 112 and accordingly confine the seat 112 to a part of the lower portion 120.

Each of the handle arms is terminated at its lower side with a tooth 1462A that is configured to engage with at least one corresponding depression 1262A, 1264A (two right and two left depressions are illustrated in FIG. 3A4) located in or communicating with the lower portion 120 such that it prevents the seat from moving relative to the lower portion. In this specific example, the depressions are formed in a protruding portion 136P in the mid-rotation unit 136 as seen in FIG. 3A3, but can be formed in another part. A torsion spring 1482A causes the tooth to move outwardly and unlock the seat from the lower portion, as illustrated by arrow AR3, when the release button is pressed inwardly, as illustrated by arrow AR4.

In FIGS. 3A3-3A7, the unlocking of the seat for rotation to the right side is illustrated. The lower portion 120 includes the cover 126 that conceals the movement mechanism and is located under the seat 112. The cover 126 has an opening 126H that enables the connection between the seat rotational element 114 (located under the cover 126, at the same level with the movement mechanism) and the seat 112 located above the cover 126. The cover 126 and the mid-rotation unit rotate together with the seat rotational element 114 about the central axis CA. This is illustrated by arrow AR5 in FIG. 3A6, and it is appreciated that the cover and mid-rotation unit (including depressions 1262A and 1264A) rotate counterclockwise when the seat is rotated clockwise towards the right side. Also noted, the left depression 1264A does not stop the cover, the mid-rotation unit and the seat from rotating although the left release button was not pressed.

As seen in FIG. 3A5, when the right release button is pressed, the tooth 1462A is released/disengaged from the depression 1262A to enable rotating the seat to the right side. As appreciated the left depressions 1264A are structured and oriented such that rotating the seat to the right, and the cover 126 counterclockwise, is enabled without the need to actively release the tooth 1464A by pressing the left release button. Therefore, the locking mechanism 140A locks the seat to the lower portion in one direction while enabling the seat to rotate in the opposite direction. Only when the two handle arms are in their locked state, the seat is not rotatable, and the seat is rotatable to a first side, and prevented from rotating to the second side, when only the handle arm at the first side is released. In other words, the locking mechanism 140A may include a ratchet assembly, enabling rotation to one side while preventing rotation to the opposite side. If the user releases the seat by pressing the right release button, it will be possible to rotate the seat to the right, and if after a short distance to the right the user pushes back the seat to the left, the seat will get locked by the engagement of the left tooth 1464A with the left depression 1264A.

FIG. 3A7 illustrates the seat 112 when fully rotated to the right side. It is appreciated that the cover and the mid-rotation unit are rotated simultaneously to the left as the seat rotational element rotates counterclockwise about the central axis.

It is noted that activating and deactivating the locking mechanism 140A, while being implemented and operated in the described example by mechanical means, it can also be operated in other forms such as electronically.

The rotatable car safety seat of the presently disclosed subject matter can include a movement mechanism that enables the above-described eccentrical movement of the seat with respect to the central axis of the lower portion together with the deviation therefrom (changing the distance of the frontmost point of the seat from the central axis), and additional relative movements between the upper (seat and seat rotational element) and lower (lower and upper bases) portions. The movement mechanism thereby includes more than one working scheme. In a first working scheme, the movement mechanism is operable to rotate the seat both about the central rotational axis of the lower portion and about the seat rotational axis, as described above. In a second scheme, the movement mechanism is operable to rotate the upper portion (including the seat and the seat rotational element) as well as additional elements (the cover and mid-rotation unit), about the central axis only. The rotatable car safety seat will be provided with a locking mechanism that can selectively unlock different elements/parts in the lower and upper portions to enable the above-described movement schemes.

Reference is made to FIGS. 4A-4F illustrating a non-limiting example of a rotatable car safety seat 100A that can be selectively rotated eccentrically and deviated from the central axis of the lower portion in one movement scheme, as described, for example, in FIGS. 1A-2B, or can be selectively rotated about the central axis of the lower portion without changing the distance of the frontmost point of the seat from the central axis CA in a second movement scheme.

Figure 4B:
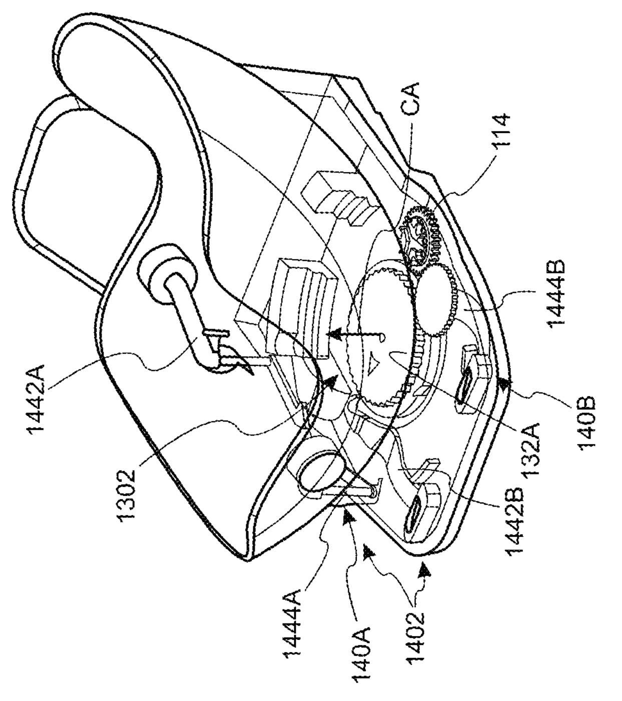
FIGS. 4A-4F illustrate a second non-limiting example of a rotatable car safety seat including a movement mechanism capable of both eccentrical and centrical seat rotations and a corresponding locking mechanism, in accordance with the presently disclosed subject matter.
Figure 4A:
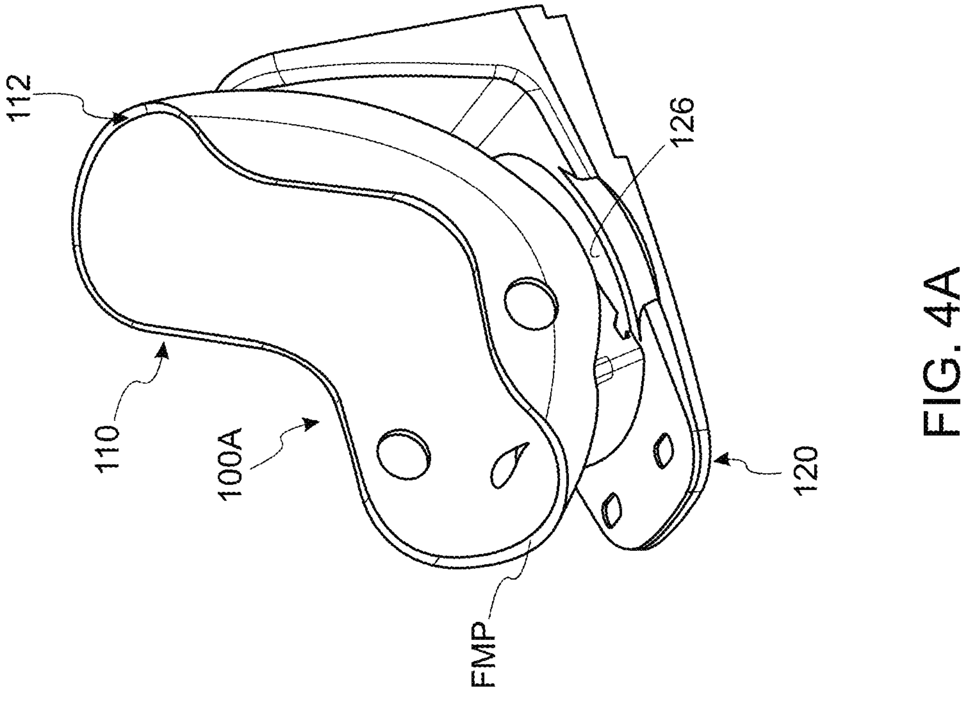

The rotatable car safety seat 100A includes a movement mechanism and a locking mechanism operable to selectively enable the two movement/rotation schemes described above. As seen in FIG. 4B, the described non-limiting movement mechanism 1302 may be at least partially configured similar to movement mechanism 130A but with additional features as will be described herein below. However, while not specifically exemplified, it will be appreciated that also the movement mechanisms 130B and 130C can be adjusted/modified to add the additional features and movement scheme. Accordingly, it is also appreciated that the above-described movement mechanisms 130A-130C can be modified to include the additional features.

Figures 4C, 4D:
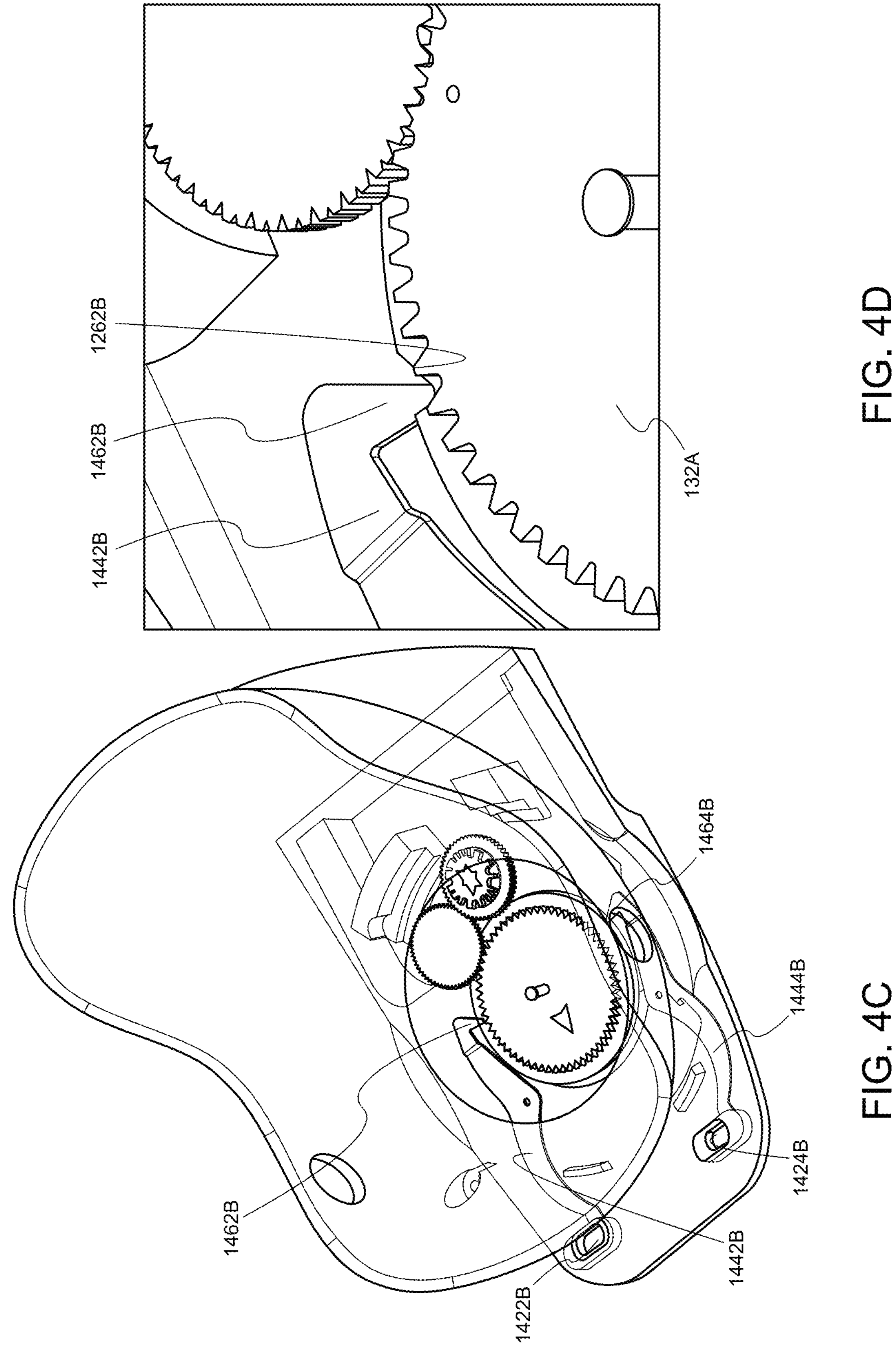
Figures 4E, 4F:
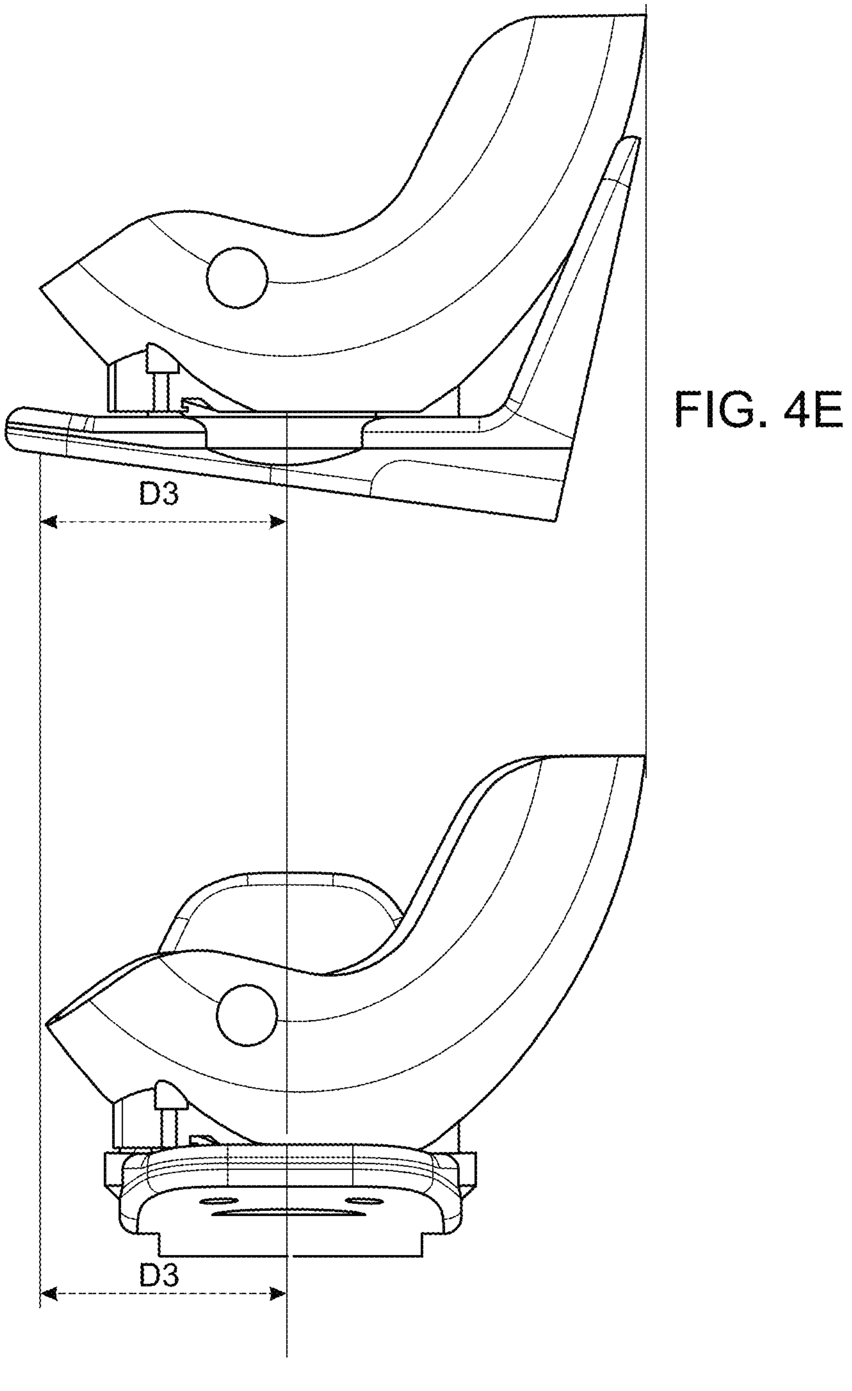

As shown in FIG. 4B, the seat 112 is turned to the right while not deviating from the central axis CA, the seat 112 is still located above the central axis CA and oriented in the direction of the central axis CA, such that the distance D3 between the frontmost point FMP and the central axis is maintained, as shown in FIGS. 4E-4F. In the described example, the central gear 132A is not fixed with respect to the lower portion 120 but can rotate relative thereto about the central axis CA. Therefore, the central gear 132A is referred to herein as a rotatable unit. The upper portion 110 including the seat and the seat rotational element 114, the cover and the mid-rotation unit (both are not visible in FIG. 4B), all have a fixed relationship with the central gear (rotatable unit) 132A and can rotate therewith.

The locking mechanism is configured to selectively unlock the rotatable unit from the upper and lower bases of the lower portion and enable its centrical rotation around its own axis that coincides with the central axis, while keeping it locked to the seat, seat rotational element, cover and mid-rotation unit (herein below referred to collectively as the upper portion), such that the upper portion rotates therewith, resulting in that the seat rotates while its orientation is maintained in the direction of the central axis and the distance between the frontmost point and the central axis is maintained; or the locking mechanism selectively unlock the rotatable unit from the upper portion, while keeping it locked to the base of the lower portion, such that the rotatable unit cannot rotate about its own axis, while the upper portion is allowed to rotate eccentrically about the central axis and the seat and the seat rotational element rotate centrically about the seat rotational axis, as described above.

In the described example, the locking mechanism 1402 includes two locking sub-mechanisms. The first sub-mechanism is the locking mechanism 140A that is configured as described above and is operable to lock and unlock the upper portion from the rotatable unit, i.e. the central gear 132A, to respectively immobilize them or allow their rotation both about the central axis CA and about the seat rotational axis SA as described above.

The second sub-mechanism is the locking mechanism 140B that is configured to lock and unlock the rotatable unit (the central gear 132A) from the lower portion and respectively disable or enable its centrical rotation, together with the upper portion, about the central axis CA.

As shown in FIGS. 4B-4D, the locking mechanism 140B includes two lever arms, a right lever arm 1442B and a left lever arm 1444B, configured to lock the rotatable unit 132A to the lower portion 120. The lever arms are terminated with switch buttons, 1422B and 1424B, located at the lower portion on the right and left sides respectively, and at the inner side the lever arm includes a tooth (1462B and 1464B) configured to engage with the rotatable unit.

In the described example, the mode of action of locking mechanism 140B is similar to that of the locking mechanism 140A. Pressing the respective switch button releases the rotatable unit from the lower portion on the respective side and enables the rotation of the upper portion together with the rotatable unit about the central axis CA of the lower portion in the respective side. Each of the right and left lever arms engages at its inner side with at least one depression formed in the rotatable unit, such as depression 1262B that is engaged by the tooth 1462B of the right lever arm 1442B, in a way such that the rotatable unit is locked to the lower portion in the respective direction while being free to rotate about the central axis in the opposite direction once the other lever arm is released. In other words, the locking mechanism 140B also includes a ratchet mechanism.

As appreciated from FIG. 4D, the right lever arm 1442B, when engaged with the depression 1262B, does not lock the rotatable unit in the left direction (counterclockwise) but only in the right direction (clockwise). While not specifically shown, the opposite is also true. The left lever arm 1444B, when engaged with the respective depression, does not lock the rotatable unit in the right direction (counterclockwise) but only in the left direction (clockwise). Therefore, to rotate the upper portion with the cover and the rotatable unit, it is required to release one of the two lever arms in each direction.

In some embodiments, the rotatable car safety seats of the presently disclosed subject matter include a soft locking mechanism operable to stabilize the seat at predefined orientation angles defining intermediate positions between the front-facing and rear-facing positions, while the seat is rotated, relative to the longitudinal axis of the lower portion. In some embodiments, the intermediate positions also include the front-facing and rear-facing positions. This is helpful in managing the safety seat without the need to frequently unlock the seat when it is located in the intermediate positions, such as when rotated in right angle towards the right or left rear doors of the car. The soft locking mechanism stabilizes (temporarily locks) the seat in the intermediate position and enables unlocking the safety seat from the intermediate position by lightly pushing or pulling the seat in the desired direction (clockwise or counterclockwise), without need for further action such as pressing a button.

Reference is made to FIGS. 5A-5F illustrating a non-limiting example of a soft locking mechanism 150 according to the presently disclosed subject matter.

The soft locking mechanism 150 is configured to rotate together with the seat so as to lock the seat at predetermined angles during rotation. For example, the soft locking is achieved at the angles 0, 90, 180, 270 (or −90) degrees with respect to the original orientation, being front-facing or rear-facing orientation (along the driving, longitudinal direction of the car. Accordingly, the soft locking mechanism has a fixed spatial relationship with respect to the rotatable seat. In the described example, the soft locking mechanism 150 is attached to a side of the mid-rotation unit 136 that also rotate with the seat, as described above.

The soft locking mechanism employs a reversible mechanism that enables automatic locking and unlocking actions without need to press a button for unlocking. In the described example, the soft locking mechanism 150 includes a spring 152 that is in compressed state and relaxes to some extent, though it keeps being compressed, when the soft locking mechanism arrives at a locking point, as will be further described below.

The soft locking mechanism is terminated with a wheel 154 that enables to unlock the seat from the soft locking point by applying a pushing or pulling force on the seat along the rotation route.

As shown, locking points 158 are configured as holes/depressions, in the cavity of the lower portion, into which the wheel 154 enters, while the seat is rotated, as a result of the compressed spring released outwardly.

Figures 5A, 5B, 5C:
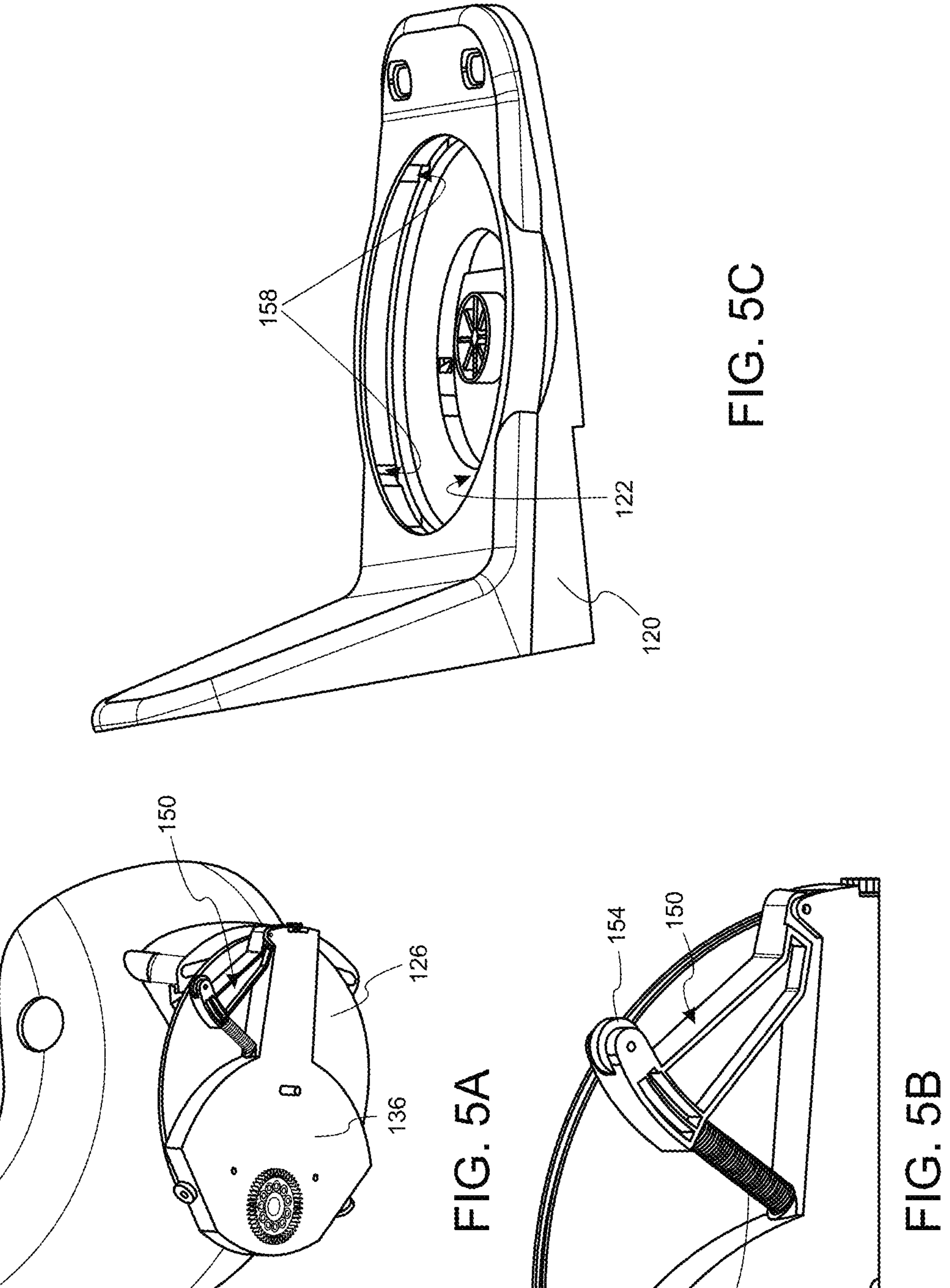
FIGS. 5A-5F illustrate a soft locking mechanism for incorporating with a rotatable car safety seat, in accordance with the presently disclosed subject matter.
Figure 5E:
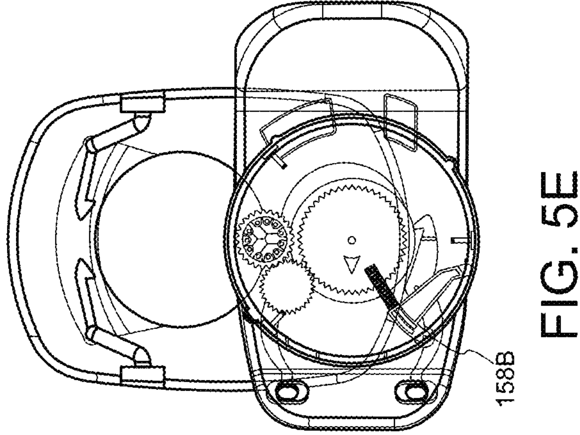
Figure 5D:
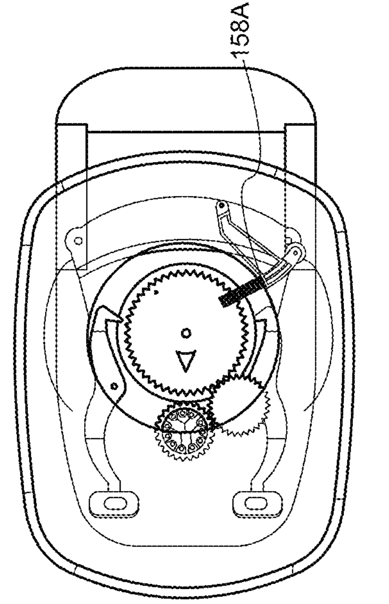
Figure 5F:
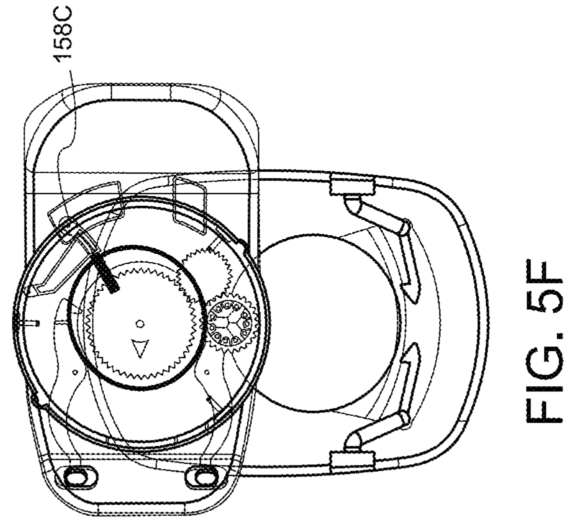

FIGS. 5D-5F illustrate bottom views of three softly locked positions of the seat; FIG. 5D is a rear-facing position of the seat, the soft locking mechanism locks the seat at locking point 158A; FIG. 5E is a lateral, right-side, position of the seat, the soft locking mechanism locks the seat at locking point 158B; FIG. 5F is a lateral, left-side, position of the seat, the soft locking mechanism locks the seat at locking point 158C. it is noted again that the cover 126 and mid-rotation unit 136 rotate in opposite direction to the seat, so for example, when the seat rotates counterclockwise from the rear-facing position (FIG. 5D) to the right-side position (FIG. 5E), the cover 126 and mid-rotation unit 136 rotate in the clockwise direction and gets unlocked from locking point 158A and locked in locking point 158B.

While the accompanied figures illustrate the soft locking mechanism in action with the eccentrical rotation of the seat about the central axis with the frontmost point of the seat changing distance therefrom and the seat deviating therefrom (to the left and right sides), it is appreciated that the soft locking mechanism can be equally applied with the central rotation of the seat (as described in FIGS. 4A-4D).

Figures 6A, 6B:
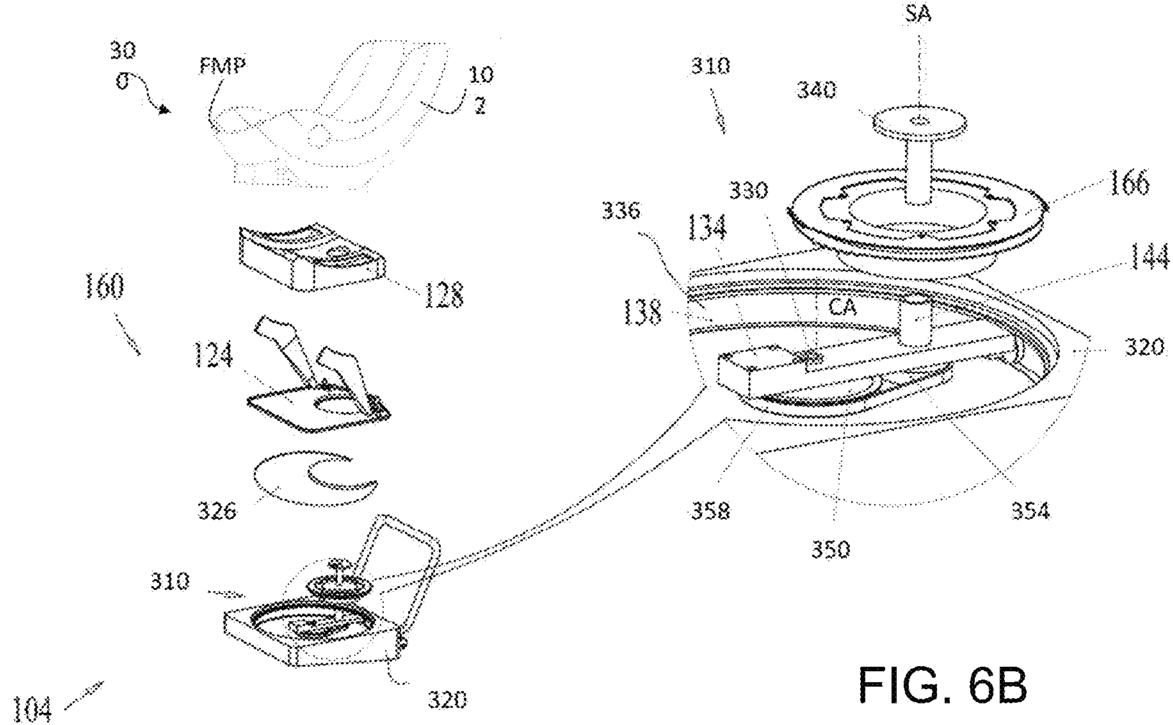
FIGS. 6A-6N illustrate yet another non-limiting example of a rotatable car safety seat including a movement mechanism capable of eccentrical rotation and orientation deviation of the seat and a corresponding locking mechanism, in accordance with the presently disclosed subject matter.
Figures 6C, 6D:
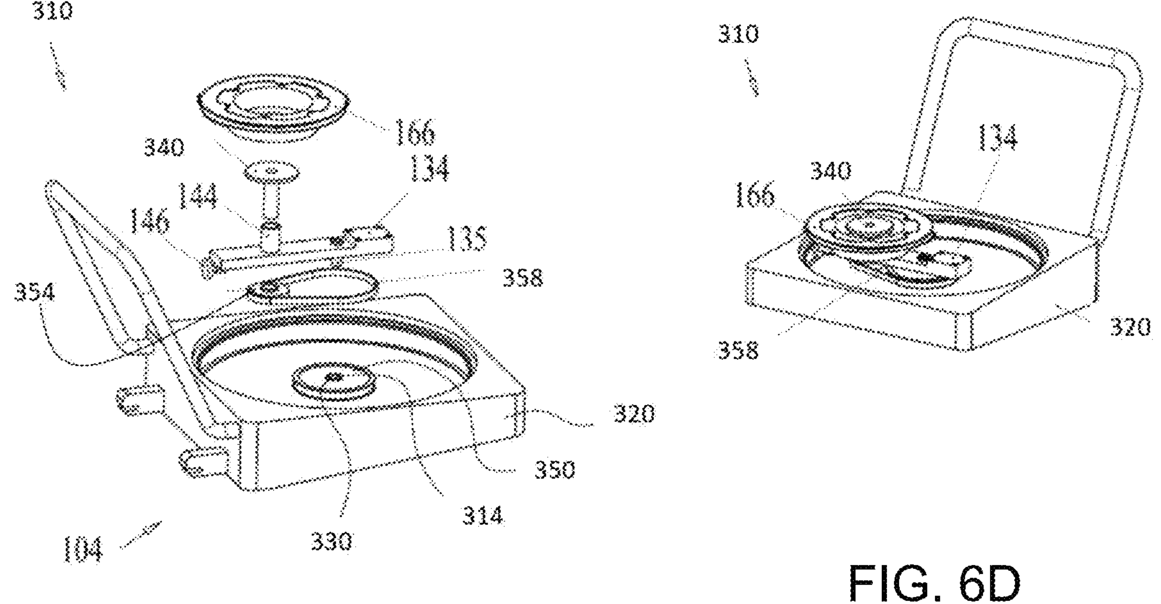
Figures 6E, 6F, 6G:
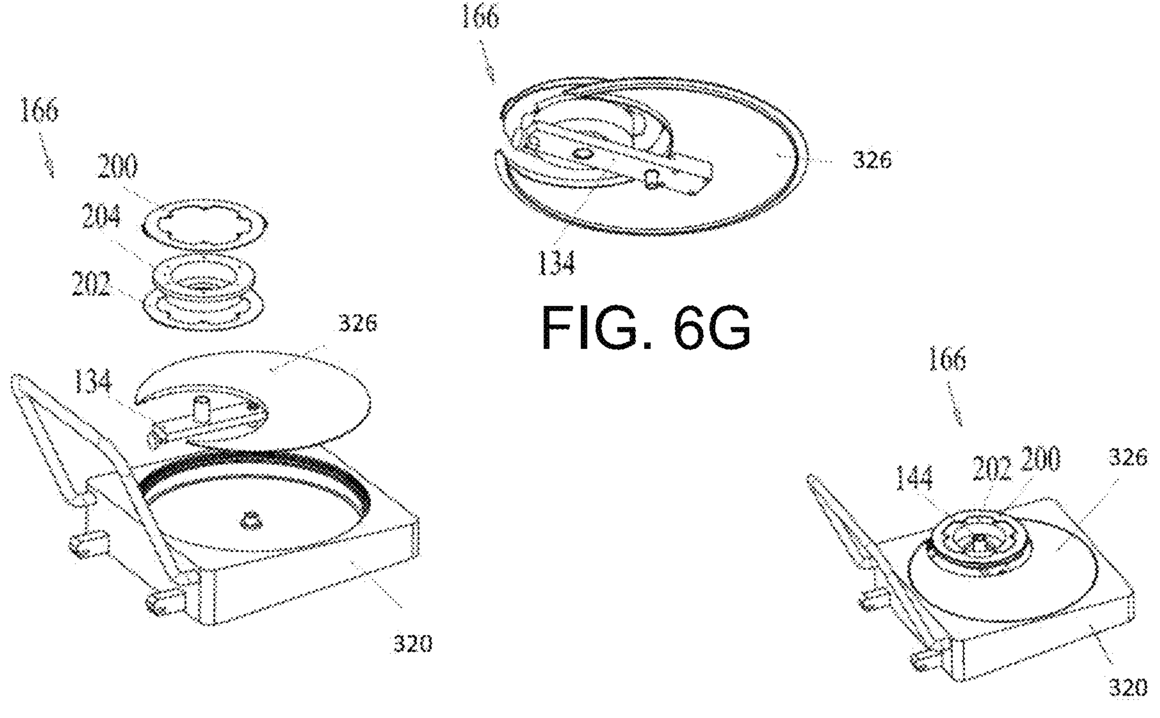
Figures 6H, 6I:
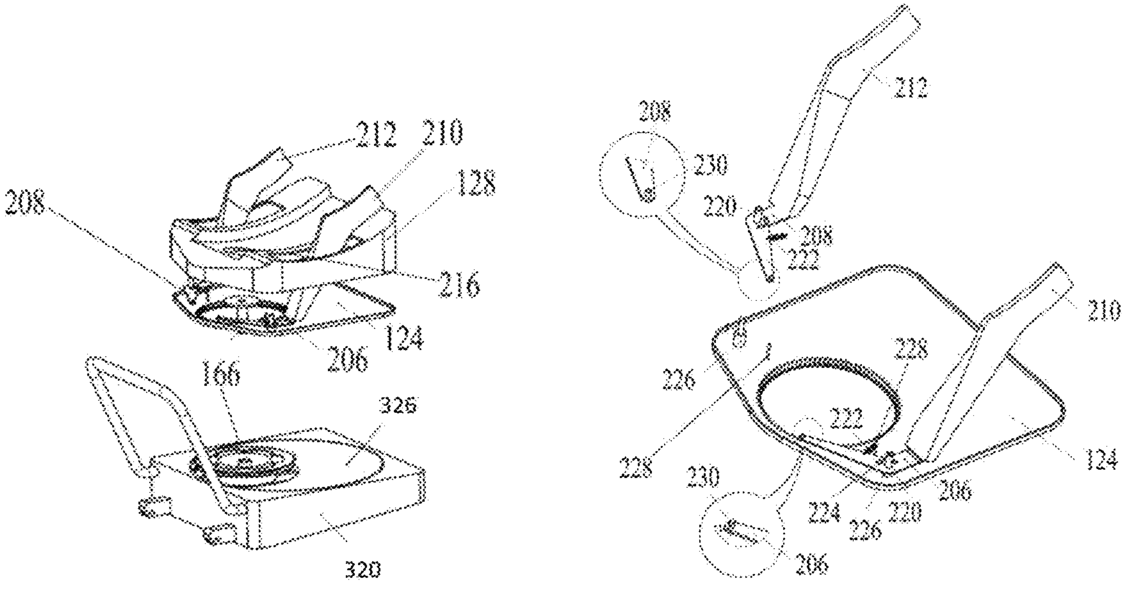
Figure 6J:
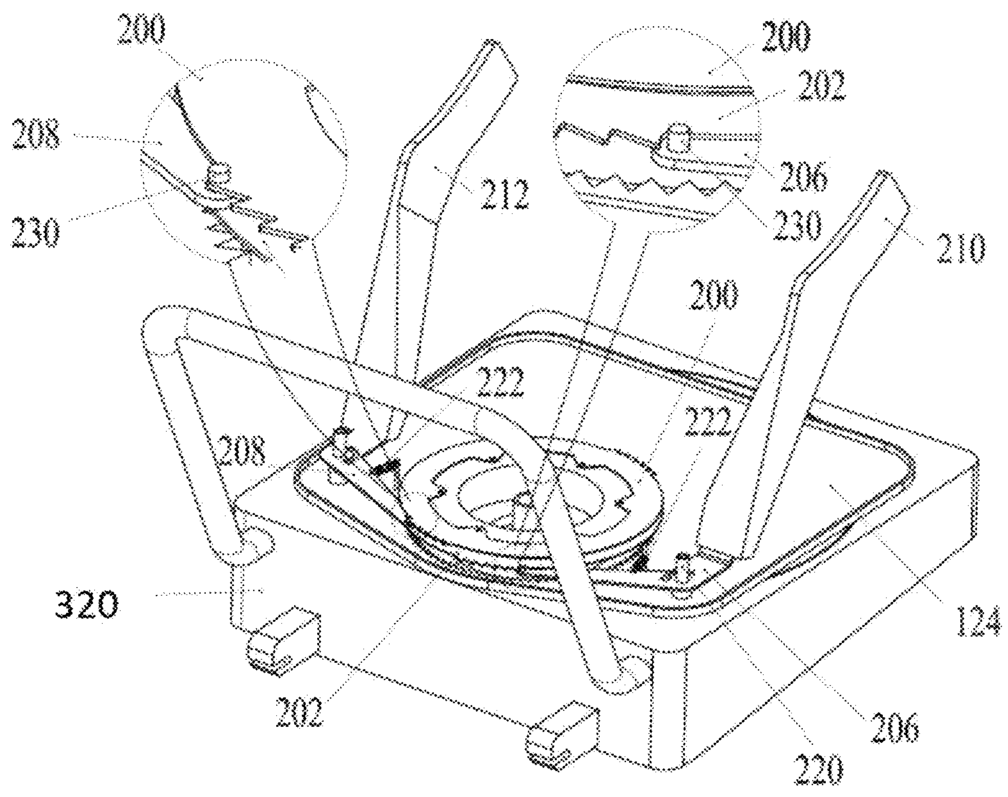
Figure 6K:
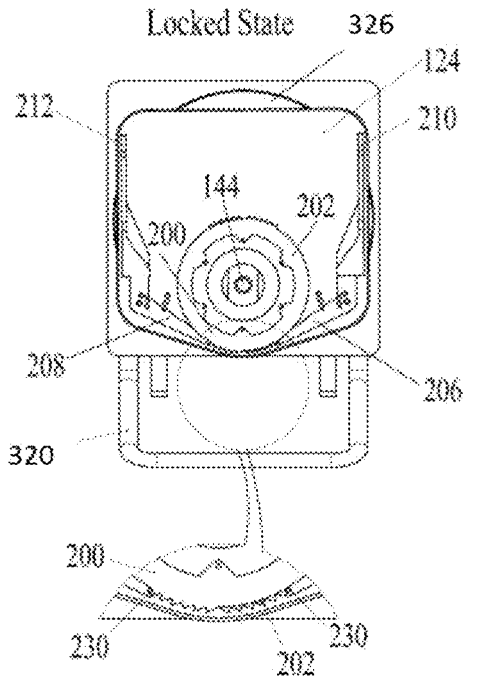
Figure 6L:
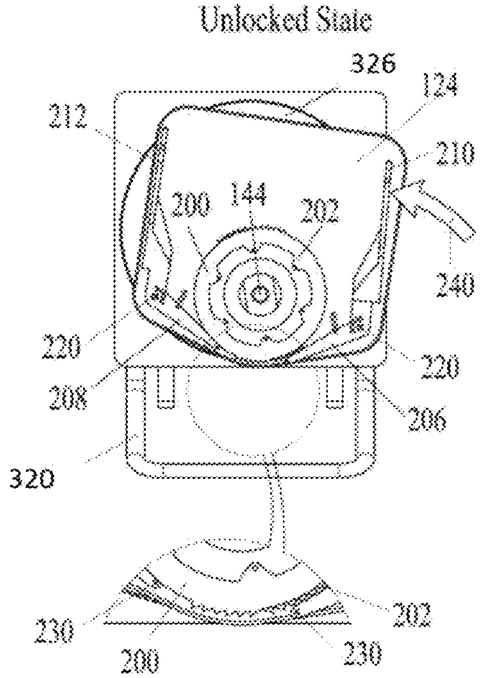
Figures 6M, 6N:
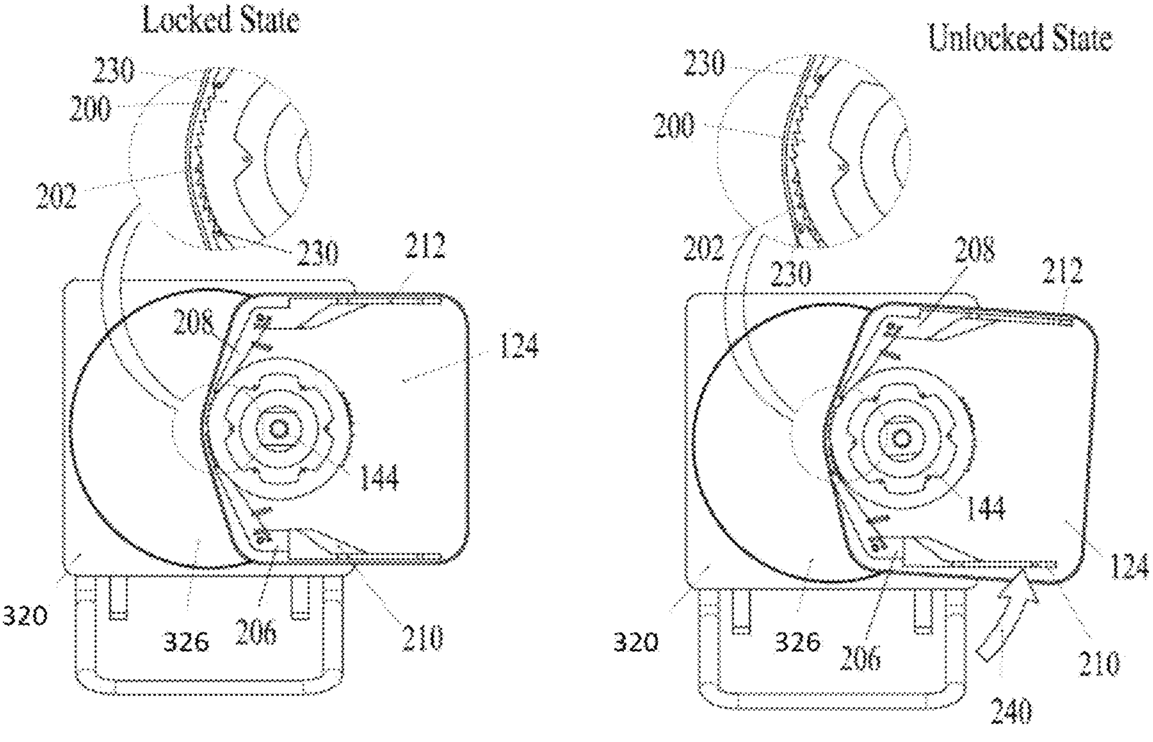

Reference is now made to FIGS. 6A-6N illustrating another embodiment of a rotatable car safety seat utilizing the principles of the presently described subject matter. Specifically, the embodiment described herein below relates to a safety seat incorporating a movement mechanism (herein below sometimes referred to as "rotation assembly"), similar to the movement mechanism described in FIGS. 1A-2A2. In addition, a locking mechanism is described having generally similar function as the locking mechanism described in FIGS. 3A1-3A7.

FIGS. 6A-6N illustrate a simplified, exemplary illustration of a vehicle rotatable safety seat 300. A shown, the safety seat 300 includes a chair portion 102 configured for seating a child therein. The chair portion 102 may be mounted on a base portion 104 and in some embodiments may be fixed to the base portion 104. The base portion 104 may be fixed to an existing vehicle seat. The safety seat 300 may include a rotation assembly 310 (FIG. 6A) configured to simultaneously eccentrically rotate the chair portion 102 about a central locus 314 (FIG. 6C) defining a central axis of the base portion 104 and change a distance between the frontmost point of the seat FMP and the central axis (thereby deviating the seat from the central locus 314).

The base portion 104 may be structured with the rotation assembly 310 and may be adaptable to mate with a plurality of types of safety seats, such as increased size safety seats as the child grows.

The chair portion 102 is mounted on the base portion 104. In some embodiments, the base portion 104 may comprise a bottom base 320 covered by an aperture cover 326 and a base cover 124. The bottom base 320, aperture cover 326 and base cover 124 may be connected to the chair portion 102 by a chair support 128.

In some embodiments, the aperture cover 326 and/or base cover 324 and any other element of the safety seat 300 may be formed with a fitted engagement with the other elements to minimize recesses so as to prevent capturing of body parts of a child therein. For example, the aperture cover 326 may be formed with a tight fitted engagement with the bottom base 320.

The rotation assembly 310 is shown to be housed in the bottom base 320, yet in some embodiments the rotation assembly 310 may be placed in any other suitable location. As seen in FIGS. 6A-6B, the rotation assembly 310 may include a central axle 330 aligned with the central locus 314. A mid-rotation unit in the form of a rotation arm 134 is mounted on the central axle 330, via a connecting protrusion 135 (FIG. 6C), and extends to a rim 336 of a central aperture 138 formed in bottom base 320. The chair portion 104 is eccentrically rotated by the rotation arm 134 by an eccentric axle 340 which is mounted on a bearing 144. The bearing 144 may protrude from the rotation arm 134 and is positioned off-center from the central locus 314. In some embodiments, a supporting wheel 146 (FIG. 6C) may be provided to support rotation arm 134.

In the embodiment shown, the rotation arm 134 may be rotated within rim 336 in a complete turn by a central wheel 350 supported by the central axle 330. The rotation arm 134 is further mounted on a peripheral wheel 354 forming the seat rotational element (that it is fixedly connected to the chair portion 102 and rotates together with it about the chair rotational axis), which may be confined to the central wheel 350 by a timing belt 358. As appreciated, this is similar to the movement mechanism 130B described above.

In some embodiments, the diameter ratio between the peripheral wheel 354 to the central wheel 350 may be approximately 1:2 for synchronizing the arm 134 rotation. Any suitable diameter ratio may be selected and in some embodiments more than two wheels may be used.

The chair portion 102 may be mounted, generally fixed, to the chair support 128 via the eccentric axle 340 inserted therein. Thus the chair portion 102 and chair support 128 (and peripheral wheel 354) rotate in unison about the bearing 144, rotated by the rotation arm 134.

It is appreciated that, the chair portion 102 together with the peripheral wheel 354 form the upper portion with the chair portion 102 having a frontmost point FMP and configured for accommodating a child, the peripheral wheel 354 having a fixed connection to the chair portion 102, such that it is rotatable together with chair portion 102 about a seat rotational axis SA of the chair. A lower portion formed by the base portion 104 has a central axis CA spaced from the seat rotational axis SA. A movement mechanism, formed by the rotation assembly 310 is connected to the peripheral wheel 354 forming the seat rotational element, the movement mechanism is operable to translate rotation of the seat rotational element about the seat rotational axis into movement of the seat rotational element along a circular trajectory around the central axis, and vice versa. Thereby ensuring that when the chair portion is caused by a user to turn, the chair portion together with the peripheral wheel is eccentrically moved relative to the central axis, and is simultaneously rotated about the seat rotational axis thereby continuously changing a distance between the frontmost point of the chair portion and the central axis.

In some embodiments, the safety seat 300 may be provided with an optional locking assembly 160 including a ratchet subassembly 166 connected to the chair portion 102 via the aperture cover 326 and base cover 324, as will be described further below.

FIGS. 6E-6N are simplified, exemplary illustrations of the rotatable vehicle safety seat equipped with the locking assembly 160. It noted that the locking mechanism 160 with the subassembly 166 can be applied with any of the movement mechanisms described above, specifically mechanisms 130A, 130B and 130C.

FIGS. 6E and 6F show the aperture cover 326, and ratchet subassembly 166 in a disassembled state and assembled state, respectively. FIG. 6G shows a bottom view of the assembled aperture cover 326 and ratchet subassembly 166. The ratchet subassembly 166 may include an upper ratchet ring 200 and a lower ratchet ring 202 attachable to ratchet support 204. As seen in FIG. 6F, the assembled ratchet subassembly 166 may surround bearing 144 and may be mounted on rotation arm 134, as seen in FIG. 6G.

FIG. 6H illustrates the partially assembled safety seat showing the assembled aperture cover 326 along with the base cover 124 and ratchet subassembly 166 of FIG. 6F.

The base cover 124 may include two oppositely facing bars 206 and 208 protruding from the base cover 124 of the base portion 104. Each bar 206 and 208 may be formed with a respective lever 210 and 212 or any other suitable switch or button extending therefrom and defining the two oppositely facing levers 210 and 212.

The levers 210 and 212 are insertable in corresponding apertures 216 formed in the chair support 128 such that the levers 210 and 212 confine the chair portion 104 therebetween.

FIG. 6I shows the base cover 124, partially assembled and FIG. 6J shows the assembled locking assembly 160 including the base cover 124 along with the ratchet subassembly 166. As seen in FIG. 6I, the bars 206 and 208 may each be connected to the base cover 124 in any suitable manner such as flexibly via bearings 220 and springs 222 allowing rotation of the bars 206 or 208 clockwise or counterclockwise as shown by arrow 224. The springs 222 may be connected to the base cover 124 in any suitable manner such as via pins 228. The bearing 220 may be supported by a rotation axle 226 or in any other suitable manner.

At an edge of each of the bars 206 and 208 may protrude a pawl 230 configured to engage with a tooth of the ratchet subassembly 166, thereby locking the upper ratchet ring 200 or the lower ratchet ring 202. The bars 206 and 208, when locked, lock the levers 210 and 212, thus locking the chair portion 102 confined therebetween. As seen in the insert in FIG. 6J, the pawl 230 of right bar 206 locks the lower ratchet ring 202 preventing clockwise rotation and the pawl 230 of left bar 208 locks the upper ratchet ring 200 preventing counterclockwise rotation. It is noted that the rotation directions can be reversed.

In some embodiments, the ratchet subassembly 166 may include a single ratchet ring with more than two toothed portions. In some embodiments, the ratchet subassembly 166 may include more than two ratchet rings. The locking assembly 160 may be configured to lock in any suitable angle, less or more than the quartered locking positions shown.

In some embodiments, the locking assembly 160 is formed with one degree of freedom, thus to lock the chair portion 102 it is sufficient to prevent the rotation of the rotation arm 134 about the base portion 104.

FIG. 6K shows the bottom base 320 (and hence the chair portion 102 mounted on the base portion 104) positioned front facing in the orientation of the vehicle travel and in a fully locked state by locking assembly 160, as shown in FIG. 6J. As seen in the insert, the pawl 230 of right bar 206 locks the lower ratchet ring 202 thus preventing clockwise rotation and the pawl 230 of left bar 208 locks the upper ratchet ring 200 thus preventing counterclockwise rotation.

FIG. 6L shows the bottom base 320 in an unlocked state during clockwise rotation to the right by pressing the right lever 210 in the direction of arrow 240. As seen in the insert, the pawl 230 of right bar 206 unlocks the lower ratchet ring 202 and the pawl 230 of left bar 208 is removed from the upper ratchet ring 200 thus allowing clockwise rotation.

The levers 210 or 212 may be replaced by any switch or button and may be pressed by the caretaker at a window formed in the chair portion 102 or any other suitable location.

The clockwise rotation is completed to the right-angle orientation relative to the rear-facing orientation as shown in FIG. 6M. As seen in the insert, the pawl 230 of right bar 206 locks the lower ratchet ring 202 thus preventing clockwise rotation and the pawl 230 of left bar 208 locks the upper ratchet ring 200 thus preventing counterclockwise rotation.

FIG. 6N shows the bottom base 320 in an unlocked state during clockwise rotation to the left by further pressing the right lever 210 in the direction of arrow 240. As seen in the insert, the pawl 230 of right bar 206 unlocks the lower ratchet ring 202 and the pawl 230 of left bar 208 is removed from the upper ratchet ring 200 thus allowing clockwise rotation.

In some embodiments, the locking system 160 may be incorporated in other swivelable systems designed to turn. For example the locking system 160 including the ratchet subassembly 166 or any other element described herein, may be used in a swivel chair, swivelable screen supports or any other swivelable system.

In some embodiments, the locking assembly 160 may be configured to lock a portion of the swivelable system. The ratchet subassembly 166 may be mounted on a portion of the swivelable system. The pawl may be positioned at any suitable location in the swivelable system and is configured to engage with a tooth of the ratchet subassembly 166, thereby locking the ratchet. The bars and extending arms may be or may not be included.

The described embodiments of FIGS. 6A-6N show the rotation assembly 310 and/or the locking assembly 160 mounted within the base portion 104. It is appreciated that the rotation assembly 310 and/or the locking assembly 160 may be placed in any suitable location within the safety seat 300, such an in the chair portion 102. In some embodiments, the rotation assembly 310 and/or the locking assembly 160 may be constructed as an auxiliary unit configured to be engaged with an existing, commercial safety seat.

The invention claimed is:

1. A rotatable car safety seat assembly, comprising:

an upper portion comprising a seat having a frontmost point and configured for accommodating a child and a seat rotational element having a fixed connection to the seat, such that it is rotatable together with the seat about a seat rotational axis;

a lower portion configured for being mounted to a passenger's seat of a car different from the seat of the upper portion and having a longitudinal direction, the lower portion having a central axis spaced from the seat rotational axis; and a movement mechanism connected to the seat rotational element and operable to translate rotation of the seat rotational element about the seat rotational axis into movement of the seat rotational element along a circular trajectory around the central axis, and vice versa; thereby ensuring that when the seat is caused by a user to turn, the seat together with the seat rotational element is eccentrically moved relative to the central axis, and is simultaneously rotated about the seat rotational axis thereby continuously changing a distance between the frontmost point of the seat and the central axis.

2. The rotatable car safety seat assembly according to claim 1, wherein the seat has a default orientation in which a line connecting the central axis and the seat rotational axis is parallel to the longitudinal direction of the car, and a maximally turned orientation in which said line is perpendicular to the longitudinal direction of the car; and optionally, said distance is maximal when the seat reaches its maximally turned orientation.

3. The rotatable car safety seat assembly according to claim 1, wherein said movement mechanism is operable to translate clockwise rotation of the seat rotational element about the seat rotational axis into counterclockwise movement of the seat rotational element along said circular trajectory around the central axis, and vice versa.

4. The rotatable car safety seat assembly according to claim 1, wherein at least a part of said movement mechanism is located between the seat rotational axis and the central axis.

5. The rotatable car safety seat assembly according to claim 1, wherein said lower portion comprises a cavity accommodating at least a part of said movement mechanism; and optionally, said cavity accommodates at least a part of said seat rotational element.

6. The rotatable car safety seat assembly according to claim 1, wherein said movement mechanism is operable so that a user can cause the seat to turn by manually pulling the seat.

7. The rotatable car safety seat assembly according to claim 1, wherein said movement mechanism comprises at least one rotatable element; and optionally, said seat rotational element and said movement mechanism form a gear assembly.

8. The rotatable car safety seat assembly according to claim 7, wherein said movement mechanism comprises at least two rotatable elements comprising a central gear having its axis coinciding with the central axis and a fixed position to the lower portion at least when the movement mechanism is operable, and an intermediate gear rotatably engaging with each of the central gear and the seat rotational element.

9. The rotatable car safety seat assembly according to claim 1, wherein said movement mechanism comprises a peripheral ring having its axis coinciding with the central axis and a fixed position to the lower portion at least when the movement mechanism is operable, the peripheral ring being formed with inner cogs that mesh with outer side of the seat rotational element; and optionally, said movement mechanism comprises a central wheel having its axis coinciding with the central axis and a fixed position to the lower portion at least when the movement mechanism is operable, and a belt connecting between the seat rotational element and the central wheel such that rotating the seat with seat rotational element eccentrically relative to the central axis causes the belt to move and affect the rotation of the seat rotational element and the seat about the seat rotational axis.

10. The rotatable car safety seat assembly according to claim 1, further comprising a soft locking mechanism operable to stabilize the seat at predefined orientation angles along the circular trajectory, while the seat is rotated.

11. The rotatable car safety seat assembly according to claim 1, further comprising a locking mechanism operable to immobilize the seat with the seat rotational element to the lower portion, the locking mechanism being configured to at least unlock the seat rotational element from the lower portion and enable rotation of the seat with the seat rotational element relative to the lower portion;

optionally, the locking mechanism is operable to selectively enable:

a first unlocked state in which the movement mechanism is operable to enable the rotational movement of the seat with the seat rotational element about the central rotational axis of the lower portion while the locking mechanism prevents the rotational movement of the seat with the seat rotational element about the seat rotational axis, and a second unlocked state in which the seat with the seat rotational element is free to rotate about the seat rotational axis and the movement mechanism is operable to translate the rotational movement of the seat with the seat rotational element about the seat rotational axis into the rotational movement of the seat with the seat rotational element about the central rotational axis and vice versa;

optionally the locking mechanism is configured to enable rotation of the seat with the seat rotational element relative to the lower portion in one direction at a time while preventing the rotation of the seat with the seat rotational element relative to the lower portion in the opposite direction; and optionally said locking mechanism comprises a ratchet assembly.

12. A rotatable car safety seat assembly, comprising:

an upper portion comprising a seat configured for accommodating a child, and a seat rotational element fixedly connected to the seat so as to be able to rotate therewith about a seat rotational axis;

a lower portion configured for being mounted to a passenger's seat of the car and having a central rotational axis spaced from the seat rotational axis and located on a longitudinal axis of the lower portion;

a movement mechanism operably connected to the seat rotational element and to the lower portion and operable to enable any of a rotational movement of the seat with the seat rotational element about the seat rotational axis and a rotational movement of the seat with the seat rotational element about the central rotational axis; and a locking mechanism operable to selectively immobilize the upper portion to the lower portion, the locking mechanism being configured to unlock the seat from the lower portion and enable rotation of the seat relative to the lower portion in one direction at a time while preventing the rotation of the seat relative to the lower portion in the opposite direction.

13. The rotatable car safety seat assembly according to claim 12, wherein said locking mechanism comprises right and left handle arms operable to lock the seat to the lower portion, the handle arms being terminated with release buttons located respectively at the right and left sides of the seat, pressing the respective release button releases the seat from the lower portion and enables the rotation of the seat in the respective direction by manually pulling the seat in the respective side; and optionally each of the right and left handle arms engages at its lower side with at least one depression formed in a way such that the seat is locked to the lower portion in the respective direction while being free to slide relative to the lower portion in the opposite direction once the other handle arm is released.

14. A rotatable car safety seat assembly, comprising:

an upper portion comprising a seat having a frontmost point and configured for accommodating a child and a seat rotational element fixedly connected to the seat so as to be able to rotate therewith about a seat rotational axis;

a lower portion configured for being mounted to a passenger's seat of the car and having a central rotational axis spaced from the seat rotational axis and located on a longitudinal axis of the lower portion;

a movement mechanism operably connected to the seat rotational element and to the lower portion and operable to enable any of a rotational movement of the seat with the seat rotational element about the seat rotational axis and a rotational movement of the seat with the seat rotational element about the central rotational axis; and a locking mechanism configured to at least indirectly lock the movement mechanism and operable to selectively enable:

a first unlocked state in which the movement mechanism is operable to enable the rotational movement of the seat with the seat rotational element about the central rotational axis of the lower portion while the locking mechanism prevents the rotational movement of the seat with the seat rotational element about the seat rotational axis, so that the frontmost point of the seat is maintained at a first distance from the central axis of the lower portion, and a second unlocked state in which the seat with the seat rotational element is free to rotate at least about the seat rotational axis so as to bring the frontmost point of the seat into at least one position in which it is spaced from the central axis of the lower portion to a second distance greater than the first distance.

15. The rotatable car safety seat assembly according to claim 14, wherein said movement mechanism comprises a rotatable unit having a unit rotational axis aligned with the central rotational axis, said locking mechanism being operable to lock the rotatable unit to prevent its rotation relative to the lower portion in said second unlocked state and to unlock the rotatable unit from the lower portion in said first unlocked state;

optionally, said locking mechanism comprises right and left handle arms configured to lock the rotatable unit to the upper portion, the handle arms being terminated with release buttons located respectively at the right and left sides of the seat, pressing the respective release button releases the upper portion from the rotatable element and enables the rotation of the seat with the seat rotational element both about the central rotational axis and about the seat rotational axis by pulling the seat; and optionally, each of the right and left handle arms engages at its lower side with at least one depression formed in the rotatable unit in a way such that the upper portion is locked to the rotatable unit in the respective direction while being free to slide relative to the rotatable unit in the opposite direction once the other handle arm is released.

16. The rotatable car safety seat assembly according to claim 14, wherein said locking mechanism comprises at least one lever arm configured to lock the rotatable unit to the lower portion, the lever arm being terminated with a switch button located at the lower portion, pressing the switch button releases the rotatable unit from the lower portion and enables the rotation of the upper portion together with the rotatable unit about the central rotational axis of the lower portion;

optionally, said at least one lever arm comprises right and left lever arms being terminated with right and left switch buttons respectively, pressing the respective switch button enables the rotation of the upper portion about the central rotational axis to the respective side only; and optionally, each of the right and left lever arms engages at its inner side with at least one tooth formed in the rotatable unit in a way such that the rotatable unit is locked to the lower portion in the respective direction while being free to rotate about the central rotational axis in the opposite direction once the other lever arm is released.

17. The rotatable car safety seat assembly according to claim 14, wherein said movement mechanism comprises a gear assembly; and optionally, said gear assembly comprises a rotatable unit, said seat rotational element and a transition gear connected between the rotatable unit and the seat rotational element, such that in the second unlocked state rotating the seat with the seat rotational element clockwise about the central rotational axis results in rotating the seat with the seat rotational element counterclockwise about the seat rotational axis and vice versa.

18. The rotatable car safety seat assembly according to claim 14, wherein said movement mechanism is at least partially hidden inside a cavity formed in the lower portion.

19. The rotatable car safety seat assembly according to claim 14, further comprising a soft locking mechanism operable to stabilize the seat at predefined orientation angles, while the seat is rotated, relative to a longitudinal axis of the lower portion.

20. The rotatable car safety seat assembly according to claim 14, wherein the movement mechanism is operable to at least one of the following:

translate the rotational movement of the seat with the seat rotational element about the seat rotational axis into the rotational movement of the seat with the seat rotational element about the central rotational axis and vice versa; and bring the seat into said position in the second unlocked state so that said frontmost point is located at a lateral distance from the longitudinal axis of the lower portion greater than that in the first unlocked state.

* * * * *